(12) United States Patent
Jia et al.

(10) Patent No.: US 12,035,315 B2
(45) Date of Patent: Jul. 9, 2024

(54) SIGNAL TRANSMISSION METHOD AND APPARATUS FOR INDICATING UPLINK TRANSMISSION RESOURCE

(71) Applicant: Huawei Technologies Co., Ltd., Shenzhen (CN)

(72) Inventors: Qiong Jia, Shanghai (CN); Jiayin Zhang, Shanghai (CN); Ji Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 326 days.

(21) Appl. No.: 17/390,616

(22) Filed: Jul. 30, 2021

(65) Prior Publication Data

US 2021/0360617 A1    Nov. 18, 2021

Related U.S. Application Data

(63) Continuation of application No. PCT/CN2020/073935, filed on Jan. 22, 2020.

(30) Foreign Application Priority Data

Jan. 31, 2019  (CN) .......................... 201910100873.2

(51) Int. Cl.
*H04W 72/04* (2023.01)
*H04L 5/00* (2006.01)
(Continued)

(52) U.S. Cl.
CPC ........... *H04W 72/21* (2023.01); *H04L 5/0051* (2013.01); *H04W 72/0453* (2013.01); *H04W 74/0833* (2013.01)

(58) Field of Classification Search
CPC ............. H04W 72/21; H04W 72/0453; H04W 74/0833; H04W 72/23; H04W 74/0841;
(Continued)

(56) References Cited

U.S. PATENT DOCUMENTS

2015/0358826 A1* 12/2015 Wei ................... H04W 74/0816
370/329
2016/0100407 A1    4/2016 Gaal et al.
(Continued)

FOREIGN PATENT DOCUMENTS

CN          106576341 A      4/2017
CN          107135053 A      9/2017
(Continued)

OTHER PUBLICATIONS

LG Electronics, "PUCCH design in LAA," 3GPP TSG RAN WG1 meeting #84bis, R1-162469, Busan, Korea, Total 5 pages, 3rd Generation Partnership Project, Valbonne, France (Apr. 11-15, 2016).

(Continued)

*Primary Examiner* — Mewale A Ambaye
(74) *Attorney, Agent, or Firm* — Leydig, Voit & Mayer, Ltd.

(57) ABSTRACT

A signal transmission method and apparatus are described. A network device indicates an uplink transmission resource to a terminal by using first indication information, and the terminal transmits a PUCCH and a first signal on the uplink transmission resource indicated by the first indication information. The uplink transmission resource is within an unlicensed frequency band, and the first signal includes one or more of a PUSCH, an SRS, and a PRACH. Thus, if resources required for PUCCH transmission are fewer than resources included in one interlace in the unlicensed frequency band, a remaining resource in the interlace may be used to transmit the first signal.

20 Claims, 7 Drawing Sheets

(51) Int. Cl.
*H04W 72/0453* (2023.01)
*H04W 72/21* (2023.01)
*H04W 74/0833* (2024.01)

(58) Field of Classification Search
CPC ..... H04W 72/04; H04W 16/14; H04W 74/08; H04L 5/0051; H04L 5/00; H04L 27/00
See application file for complete search history.

(56) References Cited

U.S. PATENT DOCUMENTS

| | | | |
|---|---|---|---|
| 2017/0280476 A1* | 9/2017 | Yerramalli | H04W 72/1268 |
| 2017/0311317 A1* | 10/2017 | Dinan | H04W 72/52 |
| 2018/0124756 A1* | 5/2018 | Ko | H04L 5/0053 |
| 2018/0302208 A1 | 10/2018 | Malladi et al. | |
| 2019/0037565 A1* | 1/2019 | Zheng | H04W 72/04 |

FOREIGN PATENT DOCUMENTS

| | | | |
|---|---|---|---|
| CN | 107231693 A | | 10/2017 |
| CN | 107241802 A | | 10/2017 |
| CN | 109039556 | * | 12/2018 |
| CN | 109039556 A | | 12/2018 |
| CN | 109413722 A | | 3/2019 |
| EP | 3410808 A1 | | 12/2018 |
| JP | 2017517983 A | | 6/2017 |
| KR | 20170016355 A | | 2/2017 |
| WO | 2016070417 A1 | | 5/2016 |
| WO | 2017196387 A1 | | 11/2017 |

OTHER PUBLICATIONS

"On uplink signal and channel structures for NR-U," 3GPP TSG RAN WG1 Meeting #94bis, Chengdu, P.R. China, R1-1810614, Total 17 pages, 3rd Generation Partnership Project, Valbonne, France (Oct. 8-12, 2018).
"UL PHY channels for NR unlicensed," 3GPP TSG RAN WG1 Meeting #93, R1-1805921, Busan, Korea, Total 9 pages, 3rd Generation Partnership Project, Valbonne, France (May 21-25, 2018).
"3rd Generation Partnership Project; Technical Specification Group Radio Access Network; NR; Physical channels and modulation (Release 15)," 3GPP TS 38.211 V15.4.0, pp. 1-96, 3rd Generation Partnership Project, Valbonne, France (Dec. 2018).
"Remaining details of PUSCH waveform for eLAA," 3GPP TSG RAN WG1 #86, R1-166249, Gothenburg, Sweden, pp. 1-5, 3rd Generation Partnership Project, Valbonne, France (Aug. 22-26, 2016).
"3rd Generation Partnership Project; Technical Specification Group Radio Access Network; NR; Physical layer procedures for control (Release 15)," 3GPP TS 38.213 V15.4.0, pp. 1-104, 3rd Generation Partnership Project, Valbonne, France (Dec. 2018).
"3rd Generation Partnership Project; Technical Specification Group Radio Access Network; NR; Physical layer procedures for data (Release 15)," 3GPP TS 38.214 V15.4.0, pp. 1-102, 3rd Generation Partnership Project, Valbonne, France (Dec. 2018).
"3rd Generation Partnership Project; Technical Specification Group Radio Access Network; NR; Radio Resource Control (RRC) protocol specification (Release 15)," 3GPP TS 38.331 V15.4.0, pp. 1-474, 3rd Generation Partnership Project, Valbonne, France (Dec. 2018).
Oppo, "UL signals and channels for NR-U," 3GPP TSG RAN WG1 Ad-Hoc Meeting 1901, Taipei, R1-1900271, Total 5 pages, 3rd Generation Partnership Project, Valbonne, France (Jan. 21-25, 2019).
Oppo, "UL design for NR-U," 3GPP TSG RAN WG1 #94, Gothenburg, Sweden, R1-1808898, Total 4 pages, 3rd Generation Partnership Project, Valbonne, France (Aug. 20-24, 2018).

* cited by examiner

SIGNAL TRANSMISSION METHOD AND APPARATUS FOR INDICATING UPLINK TRANSMISSION RESOURCE

CROSS-REFERENCE TO RELATED APPLICATIONS

This application is a continuation of International Application No. PCT/CN2020/073935, filed on Jan. 22, 2020, which claims priority to Chinese Patent Application No. 201910100873.2, filed on Jan. 31, 2019. The disclosures of the aforementioned applications are hereby incorporated by reference in their entireties.

TECHNICAL FIELD

This application relates to the field of communication technologies, and in particular, to a signal transmission method and apparatus.

BACKGROUND

Rapid development of wireless communication technologies leads to an increasing shortage of spectrum resources, and promotes exploration of unlicensed frequency bands (also referred to as "unlicensed spectrum"). Currently, a licensed-assisted access (LAA) technology and an enhanced licensed-assisted access (eLAA) technology are introduced in long term evolution (LTE) release 13 (R-13) and R-14, that is, a non-standalone LTE system or LTE-advanced (LTE-A) system is deployed in an unlicensed frequency band, and utilization of unlicensed frequency band resources is maximized with the assistance of a licensed spectrum.

However, there are many regulatory restrictions on use of the unlicensed frequency band. For example, European Telecommunications Standards Institute (ETSI) specifies that in a 5 GHz frequency band, a bandwidth actually occupied by a signal during transmission is required to be more than 80% of a system bandwidth (that is, a nominal bandwidth). In other words, an occupied channel bandwidth (OCB) of the signal needs to be greater than 80%.

In LTE-eLAA, a physical resource block (PRB) used for physical uplink shared channel (PUSCH) transmission is of an interlace structure. To be specific, resources used for PUSCH transmission are a plurality of PRBs evenly distributed in a transmission bandwidth at equal spacings. For example, as shown in FIG. 1, it is assumed that a system bandwidth is 20 MHz, a transmission bandwidth of 20 MHz corresponds to 100 PRBs, and the 100 PRBs are PRB #0 to PRB #99. One or more resource interlaces are used for PUSCH transmission, each interlace includes 10 PRBs evenly distributed in the transmission bandwidth, and every two adjacent PRBs in each interlace are spaced by 10 PRBs. For example, FIG. 1 shows one interlace, and PRBs included in the interlace are PRB #0, PRB #10, PRB #20, PRB #30, PRB #40, PRB #50, PRB #60, PRB #70, PRB #80, and PRB #90. This can ensure that a frequency domain span of each interlace (that is, a bandwidth span between the first PRB and the last PRB of each interlace) is 91 PRBs, and a bandwidth occupied by the 91 PRBs is 16.38 MHz, which is greater than 80% of the system bandwidth of 20 MHz, meeting an OCB requirement. However, in some cases, a signal sent by a terminal cannot occupy all resources of one interlace. In this case, resource allocation based on the interlace causes a waste of transmission resources.

SUMMARY

This application provides a signal transmission method and apparatus, to improve resource utilization.

To achieve the foregoing objective, this application provides the following technical solutions:

According to a first aspect, a signal transmission method is provided, and includes: A terminal receives, from a network device, first indication information used to indicate an uplink transmission resource available to the terminal, and sends a physical uplink control channel (PUCCH) and a first signal on the uplink transmission resource based on the first indication information. The uplink transmission resource is located in an unlicensed frequency band, the uplink transmission resource is used to transmit the PUCCH and the first signal, and the first signal includes one or more of a PUSCH, an SRS, and a PRACH.

According to the method provided in the first aspect, the uplink transmission resource may not only be used to transmit the PUCCH, but also be used to transmit the first signal. For example, if resources required for PUCCH transmission are fewer than resources included in one interlace, a remaining resource in the interlace may be used to transmit the first signal. This can avoid a resource waste caused when the PUCCH of the terminal does not occupy an entire interlace, thereby improving resource utilization.

In a possible implementation, the PUCCH and the first signal share the uplink transmission resource, the uplink transmission resource includes a PUCCH resource used to transmit the PUCCH and a first signal resource used to transmit the first signal. This possible implementation can prevent a resource waste caused by allocating an entire interlace to the PUCCH of the terminal, thereby improving resource utilization.

In a possible implementation, the method further includes: The terminal receives, from the network device, second indication information used to indicate that the PUCCH and the first signal share the uplink transmission resource. In this possible implementation, the terminal can determine whether the PUCCH and the first signal share the uplink transmission resource, thereby ensuring correct uplink signal transmission.

In a possible implementation, the method further includes: The terminal receives, from the network device, third indication information used to indicate the PUCCH resource. In this possible implementation, the terminal can determine the PUCCH resource, thereby correctly transmitting the PUCCH.

In a possible implementation, the uplink transmission resource includes L resource units, the resource unit is a first resource unit or a second resource unit, the second resource unit includes a plurality of first resource units, a plurality of first resource units included in one second resource unit are evenly distributed in a transmission bandwidth, and L is an integer greater than or equal to 0.

In a possible implementation, the third indication information indicates the PUCCH resource by using a bitmap. This possible implementation is a convenient and fast manner of indicating the PUCCH resource.

In a possible implementation, the third indication information is an RIV, and the RIV has a correspondence with an index of a start resource unit in the PUCCH resource and a quantity of resource units in the PUCCH resource. This possible implementation is another manner of indicating the PUCCH resource, and this manner requires a relatively small quantity of bits. Therefore, resource consumption can be reduced.

In a possible implementation, the third indication information is used to indicate a resource unit offset and a quantity of resource units, and the resource unit offset is used to indicate an offset between an index of a start resource unit in the PUCCH resource and an index of a start resource unit in the L resource units. This possible implementation is another manner of indicating the PUCCH resource.

In a possible implementation, the third indication information is used to indicate a pattern, and the pattern indicates a type of distribution, in the L resource units, of all resource units in the PUCCH resource. This possible implementation is another convenient and fast manner of indicating the PUCCH resource.

In a possible implementation, the third indication information is used to indicate a pattern identifier, the pattern identifier is used to indicate a pattern, and the pattern indicates a type of distribution, in the L resource units, of all resource units in the PUCCH resource. This possible implementation is another manner of indicating the PUCCH resource, and this manner requires a relatively small quantity of bits. Therefore, resource consumption can be reduced.

In a possible implementation, the method further includes: The terminal receives configuration information from the network device, where the configuration information is used to configure a pattern set, and the pattern set includes a plurality of patterns.

In a possible implementation, the first resource unit is a subcarrier, the first resource unit is a subcarrier group, the first resource unit is a PRB, or the first resource unit is an RBG.

According to a second aspect, a signal transmission apparatus is provided, and includes a communication unit and a processing unit, where the communication unit is configured to receive first indication information from a network device, where the first indication information is used to indicate an uplink transmission resource used by the signal transmission apparatus, the uplink transmission resource is located in an unlicensed frequency band, the uplink transmission resource is used to transmit a PUCCH and a first signal, and the first signal includes one or more of a PUSCH, an SRS, and a PRACH; and the processing unit is configured to send, by using the communication unit, the PUCCH and the first signal on the uplink transmission resource based on the first indication information.

In a possible implementation, the PUCCH and the first signal share the uplink transmission resource, the uplink transmission resource includes a PUCCH resource and a first signal resource, the PUCCH resource is used to transmit the PUCCH, and the first signal resource is used to transmit the first signal.

In a possible implementation, the communication unit is further configured to receive second indication information from the network device, where the second indication information is used to indicate that the PUCCH and the first signal share the uplink transmission resource.

In a possible implementation, the communication unit is further configured to receive third indication information from the network device, where the third indication information is used to indicate the PUCCH resource.

In a possible implementation, the uplink transmission resource includes L resource units, the resource unit is a first resource unit or a second resource unit, the second resource unit includes a plurality of first resource units, a plurality of first resource units included in one second resource unit are evenly distributed in a transmission bandwidth, and L is an integer greater than or equal to 0.

In a possible implementation, the third indication information indicates the PUCCH resource by using a bitmap.

In a possible implementation, the third indication information is an RIV, and the RIV has a correspondence with an index of a start resource unit in the PUCCH resource and a quantity of resource units in the PUCCH resource.

In a possible implementation, the third indication information is used to indicate a resource unit offset and a quantity of resource units, and the resource unit offset is used to indicate an offset between an index of a start resource unit in the PUCCH resource and an index of a start resource unit in the L resource units.

In a possible implementation, the third indication information is used to indicate a pattern, and the pattern indicates a type of distribution, in the L resource units, of all resource units in the PUCCH resource.

In a possible implementation, the third indication information is used to indicate a pattern identifier, the pattern identifier is used to indicate a pattern, and the pattern indicates a type of distribution, in the L resource units, of all resource units in the PUCCH resource.

In a possible implementation, the communication unit is further configured to receive configuration information from the network device, where the configuration information is used to configure a pattern set, and the pattern set includes a plurality of patterns.

In a possible implementation, the first resource unit is a subcarrier, the first resource unit is a subcarrier group, the first resource unit is a PRB, or the first resource unit is an RBG.

The apparatus provided in the second aspect is configured to implement the method provided in the first aspect. Therefore, for beneficial effects of various implementations of the apparatus provided in the second aspect, refer to beneficial effects of corresponding implementations of the method provided in the first aspect. Details are not described herein again.

According to a third aspect, a signal transmission method is provided, and includes: A network device sends, to a terminal, first indication information used to indicate an uplink transmission resource available to the terminal, and receives, from the terminal, a PUCCH and a first signal on the uplink transmission resource. The uplink transmission resource is located in an unlicensed frequency band, the uplink transmission resource is used to transmit the PUCCH and the first signal, and the first signal includes one or more of a PUSCH, an SRS, and a PRACH.

According to the method provided in the third aspect, the uplink transmission resource may not only be used to transmit the PUCCH, but also be used to transmit the first signal. For example, if resources required for PUCCH transmission are fewer than resources included in one interlace, a remaining resource in the interlace may be used to transmit the first signal. This can avoid a resource waste caused when the PUCCH of the terminal does not occupy an entire interlace, thereby improving resource utilization.

In a possible implementation, the PUCCH and the first signal share the uplink transmission resource, the uplink transmission resource includes a PUCCH resource used to transmit the PUCCH and a first signal resource used to transmit the first signal. This possible implementation can prevent a resource waste caused by allocating an entire interlace to the PUCCH of the terminal, thereby improving resource utilization.

In a possible implementation, the method further includes: The network device sends second indication information to the terminal, where the second indication information is used to indicate that the PUCCH and the first signal share the uplink transmission resource. In this possible implementation, the terminal can determine whether the PUCCH and the first signal share the uplink transmission resource, thereby ensuring correct uplink signal transmission.

In a possible implementation, the method further includes: The network device sends third indication information to the terminal, where the third indication information is used to indicate the PUCCH resource. In this possible implementation, the terminal can determine the PUCCH resource, thereby correctly transmitting the PUCCH.

In a possible implementation, the uplink transmission resource includes L resource units, the resource unit is a first resource unit or a second resource unit, the second resource unit includes a plurality of first resource units, a plurality of first resource units included in one second resource unit are evenly distributed in a transmission bandwidth, and L is an integer greater than or equal to 0.

In a possible implementation, the third indication information indicates the PUCCH resource by using a bitmap. This possible implementation is a convenient and fast manner of indicating the PUCCH resource.

In a possible implementation, the third indication information is an RIV, and the RIV has a correspondence with an index of a start resource unit in the PUCCH resource and a quantity of resource units in the PUCCH resource. This possible implementation is another manner of indicating the PUCCH resource, and this manner requires a relatively small quantity of bits. Therefore, resource consumption can be reduced.

In a possible implementation, the third indication information is used to indicate a resource unit offset and a quantity of resource units, and the resource unit offset is used to indicate an offset between an index of a start resource unit in the PUCCH resource and an index of a start resource unit in the L resource units. This possible implementation is another manner of indicating the PUCCH resource.

In a possible implementation, the third indication information is used to indicate a pattern, and the pattern indicates a type of distribution, in the L resource units, of all resource units in the PUCCH resource. This possible implementation is another convenient and fast manner of indicating the PUCCH resource.

In a possible implementation, the third indication information is used to indicate a pattern identifier, the pattern identifier is used to indicate a pattern, and the pattern indicates a type of distribution, in the L resource units, of all resource units in the PUCCH resource. This possible implementation is another manner of indicating the PUCCH resource, and this manner requires a relatively small quantity of bits. Therefore, resource consumption can be reduced.

In a possible implementation, the method further includes: The network device sends configuration information to the terminal, where the configuration information is used to configure a pattern set, and the pattern set includes a plurality of patterns.

In a possible implementation, the first resource unit is a subcarrier, the first resource unit is a subcarrier group, the first resource unit is a PRB, or the first resource unit is an RBG.

According to a fourth aspect, a signal transmission apparatus is provided, and includes a communication unit and a processing unit, where the communication unit is configured to send first indication information to a terminal, where the first indication information is used to indicate an uplink transmission resource available to the terminal, the uplink transmission resource is located in an unlicensed frequency band, the uplink transmission resource is used to transmit a PUCCH and a first signal, and the first signal includes one or more of a PUSCH, an SRS, and a PRACH; and the processing unit is configured to receive, from the terminal by using the communication unit, the PUCCH and the first signal on the uplink transmission resource.

In a possible implementation, the PUCCH and the first signal share the uplink transmission resource, the uplink transmission resource includes a PUCCH resource and a first signal resource, the PUCCH resource is used to transmit the PUCCH, and the first signal resource is used to transmit the first signal.

In a possible implementation, the communication unit is further configured to send second indication information to the terminal, where the second indication information is used to indicate that the PUCCH and the first signal share the uplink transmission resource.

In a possible implementation, the communication unit is further configured to send third indication information to the terminal, where the third indication information is used to indicate the PUCCH resource.

In a possible implementation, the uplink transmission resource includes L resource units, the resource unit is a first resource unit or a second resource unit, the second resource unit includes a plurality of first resource units, a plurality of first resource units included in one second resource unit are evenly distributed in a transmission bandwidth, and L is an integer greater than or equal to 0.

In a possible implementation, the third indication information indicates the PUCCH resource by using a bitmap.

In a possible implementation, the third indication information is an RIV, and the RIV has a correspondence with an index of a start resource unit in the PUCCH resource and a quantity of resource units in the PUCCH resource.

In a possible implementation, the third indication information is used to indicate a resource unit offset and a quantity of resource units, and the resource unit offset is used to indicate an offset between an index of a start resource unit in the PUCCH resource and an index of a start resource unit in the L resource units.

In a possible implementation, the third indication information is used to indicate a pattern, and the pattern indicates a type of distribution, in the L resource units, of all resource units in the PUCCH resource.

In a possible implementation, the third indication information is used to indicate a pattern identifier, the pattern identifier is used to indicate a pattern, and the pattern indicates a type of distribution, in the L resource units, of all resource units in the PUCCH resource.

In a possible implementation, the communication unit is further configured to send configuration information to the terminal, where the configuration information is used to configure a pattern set, and the pattern set includes a plurality of patterns.

In a possible implementation, the first resource unit is a subcarrier, the first resource unit is a subcarrier group, the first resource unit is a PRB, or the first resource unit is an RBG.

The apparatus provided in the fourth aspect is configured to implement the method provided in the third aspect. Therefore, for beneficial effects of various implementations of the apparatus provided in the fourth aspect, refer to beneficial effects of corresponding implementations of the method provided in the third aspect. Details are not described herein again.

According to a fifth aspect, a signal transmission method is provided, and includes: A terminal receives first indication information from a network device, where the first indication information is used to indicate a PUCCH resource available to the terminal, the PUCCH resource is a resource used by the terminal to send a PUCCH, and the PUCCH resource is located in an unlicensed frequency band; the terminal sends the PUCCH on the PUCCH resource based on the first indication information. According to the method provided in the fifth aspect, the terminal transmits the PUCCH by using the PUCCH resource that is in the unlicensed frequency band and that is allocated by the network device, to resolve a problem that the PUCCH cannot be transmitted in the unlicensed frequency band. In a possible implementation, the PUCCH resource includes L resource units, the resource unit is a first resource unit or a second resource unit, the second resource unit includes a plurality of first resource units, a plurality of first resource units included in one second resource unit are evenly distributed in a transmission bandwidth, and L is an integer greater than or equal to 0.

In a possible implementation, the first indication information indicates the L resource units by using a bitmap. This possible implementation is a convenient and fast manner of indicating the PUCCH resource.

In a possible implementation, the first indication information is an RIV, and the RIV has a correspondence with an index of a start resource unit in the PUCCH resource and a quantity of resource units in the PUCCH resource. This possible implementation is another manner of indicating the PUCCH resource, and this manner requires a relatively small quantity of bits. Therefore, resource consumption can be reduced.

In a possible implementation, the resource unit is the second resource unit, the first indication information is used to indicate a structure of the PUCCH resource and an index of a start first resource unit included in the PUCCH resource, and the structure of the PUCCH resource includes one or more of the following information: a quantity of second resource units included in the PUCCH resource, a quantity of first resource units included in each second resource unit included in the PUCCH resource, or a spacing between adjacent first resource units in first resource units included in each second resource unit included in the PUCCH resource. This possible implementation is another manner of indicating the PUCCH resource.

In a possible implementation, the method further includes: The terminal receives second indication information from the network device, where the second indication information is used to indicate whether the PUCCH is transmitted through frequency hopping.

In a possible implementation, the method further includes: The terminal receives third indication information from the network device, where the third indication information is used to indicate an index of a start resource unit and a quantity of resource units in resource units used in a next hop during the frequency hopping transmission of the PUCCH.

In a possible implementation, the first resource unit is a subcarrier, the first resource unit is a subcarrier group, the first resource unit is a PRB, or the first resource unit is an RBG.

According to a sixth aspect, a signal transmission apparatus is provided, and the apparatus has a function of implementing any method provided in the fifth aspect. The function may be implemented by hardware, or may be implemented by hardware executing corresponding software. The hardware or the software includes one or more units corresponding to the foregoing function. For example, the apparatus may include a communication unit and a processing unit. The processing unit is configured to perform a processing action (e.g., an action other than sending and/or receiving) in the fifth aspect, and the communication unit is configured to perform a sending action and/or a receiving action in the fifth aspect. Optionally, the action performed by the communication unit is performed under control of the processing unit. Optionally, the communication unit includes a sending unit and a receiving unit. In this case, the sending unit is configured to perform the sending action in the fifth aspect, and the receiving unit is configured to perform the receiving action in the fifth aspect. The apparatus may exist in a product form of a chip. For beneficial effects of various implementations of the apparatus provided in the sixth aspect, refer to beneficial effects of corresponding implementations of the method provided in the fifth aspect. Details are not described herein again.

According to a seventh aspect, a signal transmission method is provided, and includes: A network device sends first indication information to a terminal, where the first indication information is used to indicate a PUCCH resource available to the terminal, the PUCCH resource is a resource used by the terminal to send a PUCCH, and the PUCCH resource is located in an unlicensed frequency band; the network device receives, from the terminal, the PUCCH on the PUCCH resource. According to the method provided in the seventh aspect, the network device allocates the PUCCH resource in the unlicensed frequency band to the terminal, to resolve a problem that the PUCCH cannot be transmitted in the unlicensed frequency band.

In a possible implementation, the PUCCH resource includes L resource units, the resource unit is a first resource unit or a second resource unit, the second resource unit includes a plurality of first resource units, a plurality of first resource units included in one second resource unit are evenly distributed in a transmission bandwidth, and L is an integer greater than or equal to 0.

In a possible implementation, the first indication information indicates the L resource units by using a bitmap. This possible implementation is a convenient and fast manner of indicating the PUCCH resource.

In a possible implementation, the first indication information is an RIV, and the RIV has a correspondence with an index of a start resource unit in the PUCCH resource and a quantity of resource units in the PUCCH resource. This possible implementation is another manner of indicating the PUCCH resource, and this manner requires a relatively small quantity of bits. Therefore, resource consumption can be reduced.

In a possible implementation, the resource unit is the second resource unit, the first indication information is used to indicate a structure of the PUCCH resource and an index of a start first resource unit included in the PUCCH resource, and the structure of the PUCCH resource includes one or more of the following information: a quantity of second resource units included in the PUCCH resource, a quantity of first resource units included in each second resource unit included in the PUCCH resource, or a spacing between adjacent first resource units in first resource units included in each second resource unit included in the PUCCH resource. This possible implementation is another manner of indicating the PUCCH resource.

In a possible implementation, the method further includes: The network device sends second indication information to the terminal, where the second indication information is used to indicate whether the PUCCH is transmitted through frequency hopping.

In a possible implementation, the method further includes: The network device sends third indication information to the terminal, where the third indication information is used to indicate an index of a start resource unit and a quantity of resource units in resource units used in a next hop during the frequency hopping transmission of the PUCCH.

In a possible implementation, the first resource unit is a subcarrier, the first resource unit is a subcarrier group, the first resource unit is a PRB, or the first resource unit is an RBG.

According to an eighth aspect, a signal transmission apparatus is provided, and the apparatus has a function of implementing any method provided in the seventh aspect. The function may be implemented by hardware, or may be implemented by hardware executing corresponding software. The hardware or the software includes one or more units corresponding to the foregoing function. For example, the apparatus may include a communication unit and a processing unit. The processing unit is configured to perform a processing action (e.g., an action other than sending and/or receiving) in the seventh aspect, and the communication unit is configured to perform a sending action and/or a receiving action in the seventh aspect. Optionally, the action performed by the communication unit is performed under control of the processing unit. Optionally, the communication unit includes a sending unit and a receiving unit. In this case, the sending unit is configured to perform the sending action in the seventh aspect, and the receiving unit is configured to perform the receiving action in the seventh aspect. The apparatus may exist in a product form of a chip. For beneficial effects of various implementations of the apparatus provided in the eighth aspect, refer to beneficial effects of corresponding implementations of the method provided in the seventh aspect. Details are not described herein again.

According to a ninth aspect, a signal transmission apparatus is provided, and includes a processor. The processor is connected to a memory, the memory is configured to store computer-executable instructions, and the processor executes the computer-executable instructions stored in the memory, to implement any method provided in the first aspect, the third aspect, the fifth aspect, or the seventh aspect. The memory and the processor may be integrated together, or may be independent devices. If the memory and the processor are independent devices, the memory may be located inside the signal transmission apparatus, or may be located outside the signal transmission apparatus.

In a possible implementation, the processor includes a logic circuit and an input interface and/or an output interface. The output interface is configured to perform a sending action in a corresponding method, and the input interface is configured to perform a receiving action in a corresponding method.

In a possible implementation, the signal transmission apparatus further includes a communication interface and a communication bus. The processor, the memory, and the communication interface are connected by using the communication bus. The communication interface is configured to perform receiving and sending actions in a corresponding method. The communication interface may also be referred to as a transceiver. Optionally, the communication interface includes a transmitter or a receiver. In this case, the transmitter is configured to perform a sending action in a corresponding method, and the receiver is configured to perform a receiving action in a corresponding method.

In a possible implementation, the signal transmission apparatus exists in a product form of a chip.

According to a tenth aspect, a communication system is provided, and includes the signal transmission apparatuses provided in the second aspect and the fourth aspect, or the signal transmission apparatuses provided in the sixth aspect and the eighth aspect.

According to an eleventh aspect, a computer-readable storage medium is provided, and includes instructions. When the instructions are run on a computer, the computer is enabled to perform any method provided in the first aspect, the third aspect, the fifth aspect, or the seventh aspect.

According to a twelfth aspect, a computer program product including instructions is provided. When the instructions are run on a computer, the computer is enabled to perform any method provided in the first aspect, the third aspect, the fifth aspect, or the seventh aspect.

For technical effects brought by any implementation of the ninth aspect to the twelfth aspect, refer to technical effects brought by a corresponding implementation of the first aspect, the third aspect, the fifth aspect, or the seventh aspect. Details are not described herein again.

It should be noted that various possible implementations of any one of the foregoing aspects may be combined provided that the solutions are not contradictory.

DESCRIPTION OF EMBODIMENTS

In the descriptions of this application, unless otherwise specified, "l" means "or". For example, A/B may represent A or B. The term "and/or" in this specification describes only an association relationship for associated objects and represents that three relationships may exist. For example, A and/or B may represent the following three cases: Only A exists, both A and B exist, and only B exists. In addition, "at least one" means one or more, and "a plurality of" means two or more. Words such as "first" and "second" do not limit a quantity and an execution sequence, and the words such as "first" and "second" do not indicate a definite difference.

It should be noted that in this application, the term such as "example" or "for example" is used to represent giving an example, an illustration, or a description. Any embodiment or design scheme described as an "example" or with "for example" in this application should not be explained as being more preferred or having more advantages than another embodiment or design scheme. Exactly, use of "example" or "for example" is intended to present a relative concept in a specific manner.

The technical solutions provided in the embodiments of this application may be applied to various communication systems, for example, an LTE communication system, a new radio (NR) communication system using a 5th generation (5G) communication technology, a future evolved system, or a plurality of convergence communication system.

The technical solutions provided in the embodiments of this application may be applied to a plurality of communication scenarios, for example, a machine to machine (M2M) scenario, a macro-micro communication scenario, an enhanced mobile broadband (eMBB) scenario, an ultra-reliable low-latency communication (URLLC) scenario, and a massive machine-type communication (mMTC) scenario.

Figure 1:
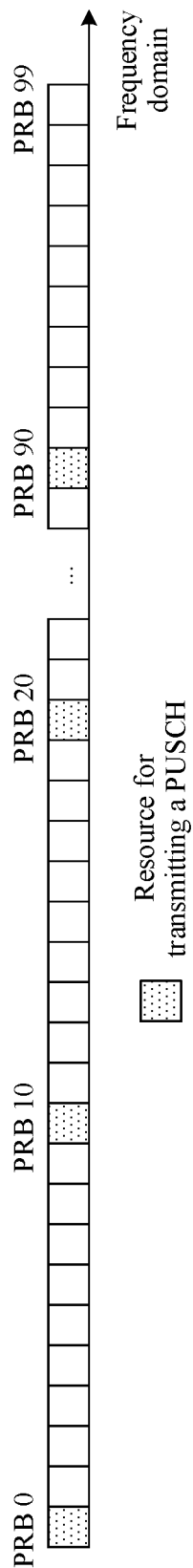
FIG. 1 is a schematic diagram of distribution of PUSCH transmission resources.
Figure 2:
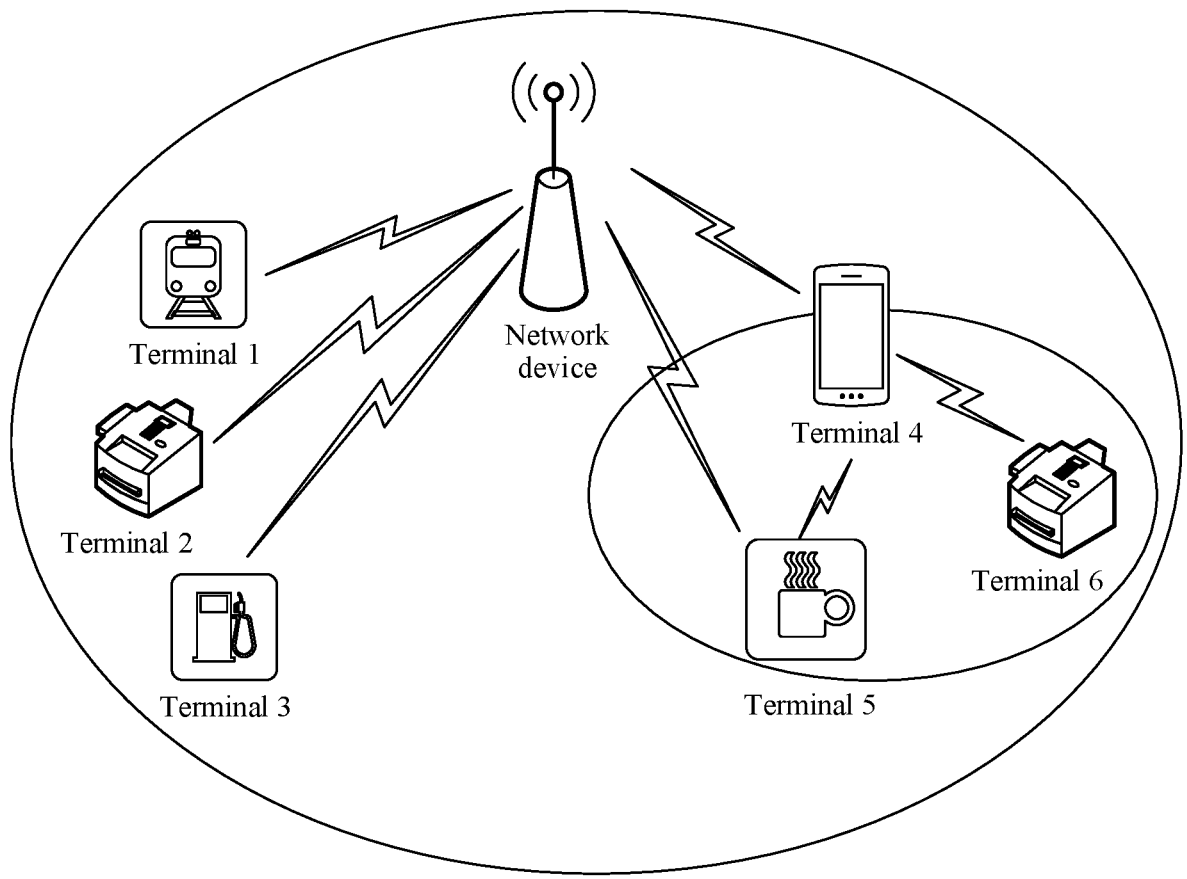
FIG. 2 is a schematic composition diagram of a network architecture according to an embodiment of this application.

FIG. 2 is a schematic diagram of a communication system to which the technical solutions provided in this application are applicable. The communication system may include at least one network device (FIG. 2 shows only one network device) and at least one terminal (FIG. 2 shows six terminals: terminal 1 to terminal 6). One or more of terminal 1 to terminal 6 may communicate with the network device, to transmit data (e.g., the PUCCH and/or the first signal below) and/or configuration information. In addition, terminal 4 to terminal 6 may constitute another communication system to which the technical solutions provided in this application are applicable. In this case, both a sending entity and a receiving entity are terminals. For example, in an internet of vehicles system, terminal 1 sends indication information (e.g., one or more of first indication information, second indication information, and third indication information below) to terminal 2, and receives data (e.g., the PUCCH and/or the first signal below) sent by terminal 2. Terminal 2 receives the indication information sent by terminal 1, and sends the data to terminal 1.

For ease of description, the following uses an example in which the technical solutions provided in the embodiments of this application are applied to a network device and a terminal. It may be understood that, when the technical solutions provided in the embodiments of this application are applied to two terminals (denoted as terminal A and terminal B), in Embodiment 1 and Embodiment 2 below, the network device is replaced with terminal A, and the terminal is replaced with terminal B.

The network device is an entity configured to send or receive a signal on a network side. The network device may be an apparatus that is deployed in a radio access network (RAN) and that provides a wireless communication function for the terminal, for example, may be a base station. The network device may be base stations in various forms, for example, a macro base station, a micro base station (also referred to as a small cell), a relay station, and an access point (AP), or may include control nodes in various forms, for example, a network controller. The control node may be connected to a plurality of base stations, and configure resources for a plurality of terminals covered by the plurality of base stations. In systems using different radio access technologies, names of a device having a base station function may be different. For example, the base station may be referred to as a base transceiver station (BTS) in a global system for mobile communication (GSM) or code division multiple access (CDMA) network, may be referred to as a NodeB in a wideband code division multiple access (WCDMA) network, may be referred to as an evolved NodeB (eNB or eNodeB) in an LTE system, or may be referred to as a next generation node base station (gNB) in an NR communication system. A specific name of the base station is not limited in this application. Alternatively, the network device may be a radio controller in a cloud radio access network (CRAN) scenario, a network device in a future evolved public land mobile network (PLMN), a transmission reception point (TRP), or the like.

The terminal is configured to provide a voice and/or data connectivity service for a user, and the terminal is an entity configured to receive or send a signal on a user side. Alternatively, the terminal may also be referred to as user equipment (UE), a terminal device, an access terminal, a subscriber unit, a subscriber station, a mobile station, a remote station, a remote terminal, a mobile device, a user terminal, a wireless communication device, a user agent, or a user apparatus. The terminal may be a mobile station (MS), a subscriber unit, an unmanned aerial vehicle, an internet of things (IoT) device, a station (ST) in a wireless local area network (WLAN), a cellular phone, a smartphone, a cordless phone, a wireless data card, a tablet computer, a session initiation protocol (SIP) phone, a wireless local loop (WLL) station, a personal digital assistant (PDA) device, a laptop computer, a machine type communication (MTC) terminal, a handheld device or a computing device with a wireless communication function or another processing device connected to a wireless modem, a vehicle-mounted device, or a wearable device (also referred to as a wearable intelligent device). The terminal may alternatively be a terminal in a next generation communication system, for example, a terminal in a future evolved PLMN, or a terminal in an NR communication system.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of a new service scenario, the technical solutions provided in the embodiments of this application are also applicable to similar technical problems.

To make the embodiments of this application clearer, some concepts mentioned in the embodiments of this application are briefly described below.

1. Unlicensed Frequency Band

The unlicensed frequency band is a frequency band in which data can be transmitted without obtaining a license, for example, a 2.4 GHz frequency band or a 5 GHz frequency band. However, data transmission in the unlicensed frequency band needs to meet a related regulation requirement, for example, a power limitation specified by ETSI or an OCB requirement.

2. System Bandwidth

The system bandwidth is a bandwidth supported or configured by the network device and the terminal, and may also be referred to as a carrier bandwidth.

3. Bandwidth Part (BWP)

The BWP is a part of the system bandwidth.

4. Transmission Bandwidth

The transmission bandwidth is a bandwidth or a quantity of resources that can be used for data transmission in the system bandwidth or the BWP.

5. Interlace Structure

The interlace structure in the embodiments of this application is a resource distribution manner. A plurality of resources with an interlace structure (which may be referred to as one interlace, for example, the first resource unit below) are evenly distributed in the transmission bandwidth at equal spacings.

6. Resource Unit

A resource unit in the embodiments of this application is a basic unit for resource allocation. The resource unit may be a first resource unit or a second resource unit. The second resource unit includes a plurality of first resource units. Quantities of first resource units included in different second resource units may be the same, or may be different.

Optionally, a plurality of first resource units included in one second resource unit are evenly distributed in the transmission bandwidth. For example, the plurality of first resource units included in one second resource unit are of an interlace structure. Alternatively, the plurality of first resource units included in one second resource unit may be unevenly distributed in the transmission bandwidth. In addition, the plurality of first resource units included in one second resource unit may be consecutive or discrete.

For example, the second resource unit may be an interlace. The interlace is a basic unit for uplink transmission resource allocation. Each interlace includes a plurality of PRBs evenly distributed in a transmission bandwidth, and every two adjacent PRBs in each interlace have a same spacing. The first resource unit is a PRB.

Optionally, the first resource unit is a subcarrier, the first resource unit is a subcarrier group, the first resource unit is a PRB, or the first resource unit is a resource block group (RBG). One subcarrier group may include a plurality of subcarriers, and one RBG may include a plurality of PRBs. Certainly, the first resource unit may alternatively be a resource element (RE), a scheduling block (SB, also referred to as an RB pair), or the like. This is not specifically limited in the embodiments of this application.

It should be noted that the first resource unit and the second resource unit may also have other names. For example, the first resource unit may be referred to as a resource unit, and the second resource unit may be referred to as a resource unit group. In this case, one resource unit group includes a plurality of resource units, and the resource unit may be a subcarrier, a subcarrier group, a PRB, an RBG, an RE, an SB, or the like.

Embodiment 1

Figure 3:
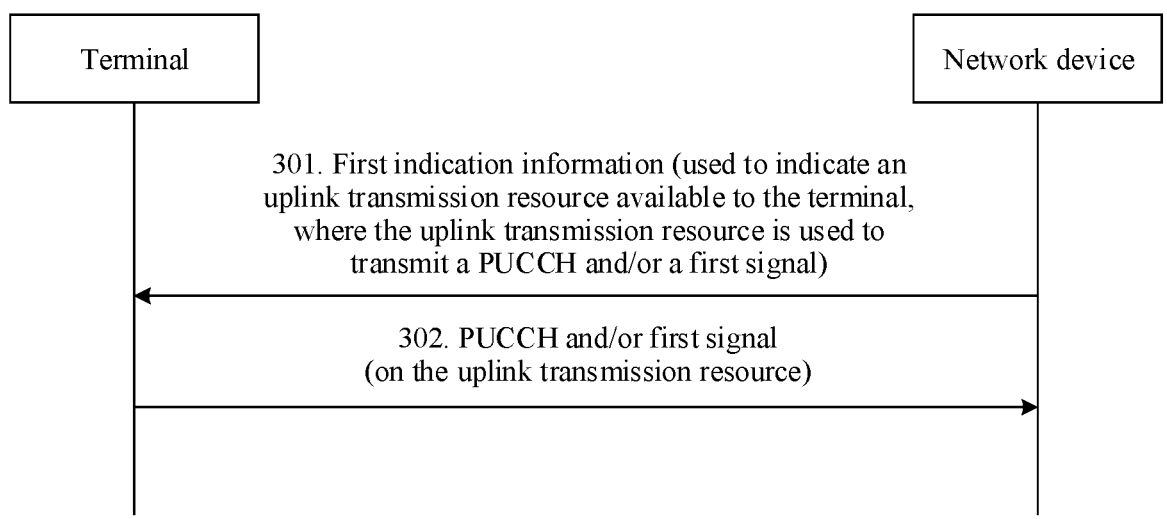
FIG. 3 is a flowchart of a signal transmission method according to an embodiment of this application.

To improve resource utilization, Embodiment 1 provides a signal transmission method. As shown in FIG. 3, the method includes the following steps.

301. A network device sends first indication information to a terminal, where the first indication information is used to indicate an uplink transmission resource available to the terminal. Correspondingly, the terminal receives the first indication information from the network device.

It should be noted that in some scenarios (e.g., in a scenario in which the terminal successfully performs listen before talk (LBT)), the first indication information may alternatively indicate an uplink transmission resource actually used by the terminal.

The first indication information may be carried in higher layer signaling and/or downlink control information (DCI) (that is, a UL grant). The higher layer signaling may be radio resource control (RRC) signaling, media access control control element (MAC CE) signaling, or the like. When the first indication information is carried in the DCI, the network device may indicate the uplink transmission resource by using, for example, a frequency domain resource allocation field in DCI format 0_0 or DCI format 0_1 defined in NR.

The uplink transmission resource is located in an unlicensed frequency band, and the uplink transmission resource is used to transmit a PUCCH and/or a first signal. The first signal includes one or more of a PUSCH, an SRS, and a PRACH. It should be noted that the first signal may further include an uplink signal other than the PUCCH, the PUSCH, the SRS, and the PRACH. This is not limited in this embodiment of this application.

Optionally, the uplink transmission resource includes L resource units, and L is an integer greater than or equal to 0. When L=0, it indicates that the network device does not allocate an uplink transmission resource to the terminal. In this case, if the terminal determines, based on the first indication information, that no uplink transmission resource is available, the terminal does not perform uplink transmission.

Optionally, to ensure that the uplink transmission resource meets an OCB requirement of the ETSI, a ratio of a frequency domain span of the uplink transmission resource to a transmission bandwidth is greater than a preset threshold. The frequency domain span of the uplink transmission resource is a bandwidth span between the first resource unit and the last resource unit in the uplink transmission resource. The preset threshold may be determined according to the OCB requirement of the ETSI. For example, for a 5 GHz frequency band, the preset threshold may be 80%.

302. The terminal sends the PUCCH and/or the first signal on the uplink transmission resource based on the first indication information. Correspondingly, the network device receives the PUCCH and/or the first signal from the terminal on the uplink transmission resource.

According to the method provided in this embodiment of this application, the uplink transmission resource may not only be used to transmit the PUCCH, but also be used to transmit the first signal. For example, if resources required for PUCCH transmission are fewer than resources included in one interlace, a remaining resource in the interlace may be used to transmit the first signal. This can avoid a resource waste caused when the PUCCH of the terminal does not occupy an entire interlace, thereby improving resource utilization.

In addition, in LTE-eLAA, transmission of a PUCCH in an unlicensed frequency band cannot be supported. According to the method provided in Embodiment 1, a PUCCH resource in the unlicensed frequency band is allocated to the terminal, to resolve a problem that the PUCCH cannot be transmitted in the unlicensed frequency band.

In step 301, the first indication information may indicate the uplink transmission resource in either of the following manner 1 or manner 2. When the resource unit is a second resource unit, the first indication information may alternatively indicate the uplink transmission resource in manner 3, manner 4, or manner 5.

Manner 1: The first indication information indicates the uplink transmission resource by using a bitmap.

In manner 1, the first indication information may indicate the uplink transmission resource by using a bitmap. Each resource unit corresponds to one bit in the bitmap. A value of the bit may represent whether a resource unit corresponding to the bit is allocated for uplink transmission. A first value of the bit may indicate that the resource unit corresponding to the bit is allocated for uplink transmission. A second value of the bit may represent that the resource unit corresponding to the bit is not allocated for uplink transmission. For example, in a possible implementation, a value of a bit is "1", indicating that a resource unit corresponding to the bit is allocated for uplink transmission. In another possible implementation, a value of a bit is "0", indicating that a resource unit corresponding to the bit is allocated for uplink transmission.

For example, assuming that the transmission bandwidth corresponds to a total of 20 PRBs, and each of the 20 PRBs corresponds to one bit, the bitmap has a total of 20 bits. If a value of a bit is "1", it indicates that a PRB corresponding to the bit is allocated for uplink transmission. If the bitmap is 10000000000000000010, it indicates that the first PRB (namely, PRB #0) and the nineteenth PRB (namely, PRB #18) in the 20 PRBs are used for uplink transmission. In this embodiment of this application, PRB #i is a PRB whose index or sequence number is i. This embodiment of this application uses an example in which indexes or sequence numbers of the PRBs start from 0 for description. During actual implementation, indexes or sequence numbers of the PRBs may alternatively start from 1 or another value.

Manner 2: The first indication information is a resource indication value (RIV). The RIV has a correspondence with an index of a start resource unit in the uplink transmission resource and a quantity of resource units in the uplink transmission resource.

In manner 2, one RIV corresponds to an index of a start resource unit in one uplink transmission resource and a quantity of resource units in one uplink transmission resource. Different RIVs correspond to different indexes of start resource units in uplink transmission resources and/or different quantities of resource units in the uplink transmission resources. The network device indicates the RIV to the terminal, and the terminal learns of, based on the RIV, the index of the start resource unit used for uplink transmission and the quantity of resource units, to further learn of a position of a resource used for uplink transmission.

For example, referring to Table 1, four RIVs are RIV 1, RIV 2, RIV 3, and RIV 4. Indexes of start resource units corresponding to the four RIVs are 1, 2, 1, and 2. Quantities of resource units corresponding to the four RIVs are 10, 20, 10, and 20.

TABLE 1

| RIV | Index of a start resource unit | Quantity of resource units |
|---|---|---|
| RIV 1 | 1 | 10 |
| RIV 2 | 2 | 10 |
| RIV 3 | 1 | 20 |
| RIV 4 | 2 | 20 |

The RIV may be obtained through calculation based on the index of the start resource unit and the quantity of resource units. The following uses an example in which the resource unit is a PRB to describe an RIV calculation manner in manner 1. It may be understood that the RIV calculation manner is not limited to the manner described in this specification, and may be another manner. This is not limited in this embodiment of this application.

For example, it is assumed that uplink transmission is performed in a BWP, an index of a start PRB used for the uplink transmission is denoted as $PRB_{start}$, a quantity of PRBs used for the uplink transmission is denoted as $L_{PRBs}$, and a quantity of PRBs corresponding to a transmission bandwidth in the BWP is denoted as $N_{BWP}^{size}$.

If $(L_{PRBs}-1) \le \lfloor N_{BWP}^{size}/2 \rfloor$, $RIV = N_{BWP}^{size}(L_{PRBs}-1) + PRB_{start}$; or if $(L_{PRBs}-1) > \lfloor N_{BWP}^{size}/2 \rfloor$, $RIV = N_{BWP}^{size}(N_{BWP}^{size} - L_{PRBs}+1) + (N_{BWP}^{size}-1-PRB_{start})$.

Manner 3: The uplink transmission resource includes L second resource units, and the first indication information is an RIV. The RIV has a correspondence with an index of a start first resource unit in the uplink transmission resource and a quantity of second resource units in the uplink transmission resource.

In manner 3, one RIV corresponds to an index of a start first resource unit in one uplink transmission resource and a quantity of second resource units in one uplink transmission resource. Different RIVs correspond to different indexes of start first resource units in uplink transmission resources and/or different quantities of second resource units in the uplink transmission resources. The network device indicates the RIV to the terminal, and the terminal learns of, based on the RIV, the index of the start first resource unit used for uplink transmission and the quantity of second resource units, to accurately learn of a position of a resource used for uplink transmission.

For example, it is assumed that the first resource unit is a PRB, and spacings between adjacent PRBs in different second resource units are the same. A quantity of PRBs between two adjacent PRBs in the second resource unit is denoted as N, a quantity of PRBs included in the second resource unit is denoted as M, a quantity of PRBs corresponding to the transmission bandwidth is denoted as $N_{BWP}^{size}$, and an index of a start PRB in the uplink transmission resource is denoted as $PRB_{start1}$. In this case, a PRB set included in the uplink transmission resource (that is, the L second resource units) includes all PRBs whose indexes are $PRB_{start1}+1+i*N$. l=0, 1, ..., L−1, i=0, 1, ..., M−1, and $M = \lfloor N_{BWP}^{size}/N \rfloor$ or $M = \lceil N_{BWP}^{size}/N \rceil$. "*" in the embodiments of this application represents "multiply".

In this case, if $(L-1) \le \lfloor N/2 \rfloor$, $RIV = N(L-1) + PRB_{start1}$; or if $(L-1) > \lfloor N/2 \rfloor$, $RIV = N(N-L+1) + (N-1-PRB_{start1})$.

Figure 4:
FIG. 4 is a schematic diagram of distribution of uplink transmission resources according to an embodiment of this application.
Figure 4:
Figure 4:
Figure 4:
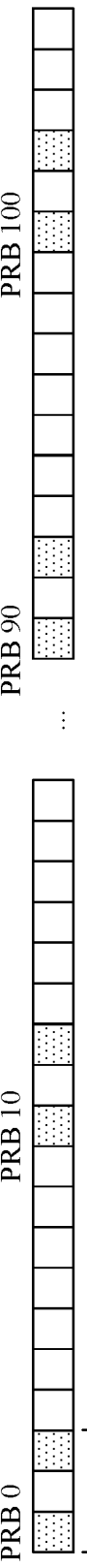

For example, referring to FIG. 4, assuming that $N_{BWP}^{size}=106$ PRBs and N=10 PRBs, M=11 or M=10. In an example (a) in FIG. 4, L=1, and $PRB_{start1}=0$. Therefore, the uplink transmission resource includes 11 PRBs in total: PRB #0, PRB #10, PRB #20, ..., and PRB #100. In this case, RIV=0. In an example (b) in FIG. 4, L=2, and $PRB_{start1}=0$. Therefore, the uplink transmission resource includes 22 PRBs in total: PRB #0, PRB #1, PRB #10, PRB #11, PRB #20, PRB #21, PRB #100, and PRB #101. In this case, RIV=10.

Optionally, in an alternative implementation of manner 3, one RIV may correspond to an index of a start second resource unit in one uplink transmission resource and a quantity of second resource units in one uplink transmission resource. It may be understood that there is a correspondence between an index of a second resource unit and an index of a first resource unit included in the second resource unit. For example, indexes of first resource units included in a second resource unit whose index is 0 may be 0, 10, 20, ..., and 90. Therefore, in the indication manner in manner 3, equivalent processing may be performed on an index of a second resource unit and an index of a corresponding first resource unit. In other words, the terminal may determine the index of the start first resource unit based on the index of the start second resource unit, and then determine the uplink transmission resource based on the RIV.

Manner 4: The uplink transmission resource includes L second resource units, and the first indication information is used to indicate an index of a start first resource unit of the 1st second resource unit in the uplink transmission resource, a quantity of second resource units in the uplink transmission resource, and an offset between an index of a start first resource unit of each of the $2^{nd}$ to the $L^{th}$ second resource units and the index of the start first resource unit of the Pt second resource unit.

In manner 4, the terminal may determine the uplink transmission resource based on the first indication information.

For example, it is assumed that the first resource unit is a PRB, and spacings between adjacent PRBs in different second resource units are the same. A quantity of PRBs between two adjacent PRBs in the second resource unit is denoted as N, a quantity of PRBs included in the second resource unit is denoted as M, a quantity of PRBs corresponding to the transmission bandwidth is denoted as $N_{BWP}^{size}$, an index of a start PRB of the $1^{st}$ second resource unit in the uplink transmission resource is denoted as $PRB_{start1}$, and an offset between an index of a start PRB of the $l^{th}$ (where l is an integer greater than or equal to 0 and less than L) second resource unit in the L second resource units and the index of the start PRB in the $1^{st}$ second resource unit is denoted as offset l. In this case, a PRB set included in the uplink transmission resource (that is, the L second resource units) includes all PRBs whose indexes are $PRB_{start1}$+offset+i*N. offset=offset0, offset1, offset(L−1), l=0, 1, . . . , M−1, and M=$\lfloor N_{BWP}^{size}/N \rfloor$ or M=$\lceil N_{BWP}^{size}/N \rceil$.

All start first resource units in the L second resource units may be consecutive or inconsecutive, which specifically depends on a value of the offset. If offset0, offset1, . . . , and offset(L−1) are consecutive values, all the start first resource units in the L second resource units are consecutive. If offset0, offset1, . . . , and offset(L−1) are inconsecutive values, all the start first resource units in the L second resource units are inconsecutive.

For example, referring to FIG. 4, it is assumed that $N_{BWP}^{size}$=106 PRBs and N=10 PRBs. In an example (c) in FIG. 4, L=2, offset0=0, offset1=1, and $PRB_{start1}$=0. Therefore, the uplink transmission resource includes 22 PRBs in total: PRB #0, PRB #1, PRB #10, PRB #11, PRB #20, PRB #21, PRB #100, and PRB #101. In an example (d) in FIG. 4, L=2, and offset0=0, offset1=2, $PRB_{start1}$=0. Therefore, the uplink transmission resource includes 22 PRBs in total: PRB #0, PRB #2, PRB #10, PRB #12, PRB #20, PRB #22, PRB #100, and PRB #102.

Manner 5: The resource unit is the second resource unit, the first indication information is used to indicate a structure of the uplink transmission resource and/or an index of a start first resource unit (or a start second resource unit) included in the uplink transmission resource, and the structure of the uplink transmission resource includes one or more of the following information: a quantity of second resource units included in the uplink transmission resource, a quantity of first resource units included in each second resource unit included in the uplink transmission resource, or a spacing between adjacent first resource units in first resource units included in each second resource unit included in the uplink transmission resource.

In manner 5, the terminal may determine a start position of the uplink transmission resource based on the start first resource unit (or the start second resource unit), and then determine distribution of the uplink transmission resource in the transmission bandwidth based on the structure of the uplink transmission resource, to accurately determine the uplink transmission resource.

Optionally, the PUCCH and the first signal share the uplink transmission resource, the uplink transmission resource includes a PUCCH resource and a first signal resource, the PUCCH resource is used to transmit the PUCCH, and the first signal resource is used to transmit the first signal.

Any one of the uplink transmission resource, the PUCCH resource, and the first signal resource may be of an interlace structure or may not be of the interlace structure in the transmission bandwidth. This is not specifically limited in this embodiment of this application. A sum of the PUCCH resource and the first signal resource may be a part or all of the uplink transmission resource.

It should be noted that, that the PUCCH and the first signal share the uplink transmission resource may be preset on the terminal, or may be indicated by the network device. If the network device indicates that the PUCCH and the first signal share the uplink transmission resource, optionally, the method further includes:

The network device sends second indication information to the terminal, where the second indication information is used to indicate that the PUCCH and the first signal share the uplink transmission resource. Correspondingly, the terminal receives the second indication information from the network device. The terminal may determine, based on the second indication information, that the PUCCH and the first signal share the uplink transmission resource.

The second indication information may be carried in higher layer signaling (e.g., RRC signaling or MAC CE signaling) and/or DCI. For example, if the second indication information is carried in the RRC signaling, one piece of indication information may be added to a PUCCH configuration (PUCCH config) parameter in the RRC signaling. If the indication information is "1", it indicates that the PUCCH and the first signal share the uplink transmission resource. If the indication information is "0", it indicates that the PUCCH and the first signal do not share the uplink transmission resource. For example, if the first signal is a PUSCH, the indication information indicates that the PUCCH and the PUSCH share the uplink transmission resource, and a name of the indication information may be referred to as PUCCH-PUSCH multiplexing.

The first indication information indicates the uplink transmission resource, and the uplink transmission resource may be used to transmit both the PUCCH and the first signal. In addition, the terminal does not know which resources in the uplink transmission resource are specifically used by the terminal to perform PUCCH transmission. Therefore, the terminal further needs to learn of a resource for transmitting the PUCCH in the uplink transmission resource. In this case, the method may further include: The network device sends third indication information to the terminal, where the third indication information is used to indicate the PUCCH resource. Correspondingly, the terminal receives the third indication information from the network device. The terminal may determine the PUCCH resource in the uplink transmission resource based on the third indication information.

The third indication information may be carried in higher layer signaling (e.g., RRC signaling or MAC CE signaling) and/or DCI. When the third indication information is carried in the DCI, an existing field in the DCI may be used to indicate the PUCCH resource. For example, a PUCCH resource indicator field in DCI format 1_0 or DCI format 1_1 may be used to indicate the PUCCH resource. Certainly, a new field may alternatively be added to the DCI to indicate the PUCCH resource.

A function of the third indication information may be implemented in any one of the following manner 1 to manner 6.

Manner 1: The third indication information indicates the PUCCH resource by using a bitmap.

In manner 1, a length of the bitmap may be equal to a quantity of first resource units included in the uplink transmission resource, and each bit in the bitmap corresponds to one first resource unit in the uplink transmission resource. A value of one bit may represent whether a first resource unit corresponding to the bit is allocated for uplink transmission. For example, in a possible implementation, a value of a bit is "1", indicating that a first resource unit corresponding to the bit is allocated for uplink transmission. In another possible implementation, a value of a bit is "0", indicating that a first resource unit corresponding to the bit is allocated for uplink transmission.

For example, it is assumed that the uplink transmission resource includes 11 PRBs in total: PRB #0, PRB #10, . . . , and PRB #100. A bitmap of 11 bits may be used for indication, and each bit corresponds to one PRB in the uplink transmission resource. If a value of a bit is "1", it indicates that a PRB corresponding to the bit is allocated for uplink transmission. If the bitmap is 10000000000, it indicates that the first PRB (namely, PRB #0) in the 11 PRBs is used for PUCCH transmission.

Manner 2: The third indication information is used to indicate a resource unit offset and a quantity of resource units. The resource unit offset is used to indicate an offset between an index of a start resource unit in the PUCCH resource and an index of a start resource unit in the L resource units.

The quantity of resource units is a quantity of consecutive resource units. For example, it is assumed that the uplink transmission resource includes 11 PRBs in total: PRB #0, PRB #10, . . . , and PRB #100. If the offset indicated by the third indication information is 0 and the quantity of resource units that is indicated by the third indication information is 2, the first PRB (namely, PRB #0) and the second PRB (namely, PRB #10) in the 11 PRBs are used for PUCCH transmission.

It should be noted that, in manner 2, if the PUCCH resource occupies only one of the L resource units by default, the third indication information may alternatively indicate only the resource unit offset, and does not indicate the quantity of resource units. For example, it is assumed that the uplink transmission resource includes 11 PRBs in total: PRB #0, PRB #10, . . . , and PRB #100, the PUCCH resource occupies only one PRB, and three bits are used to indicate the resource unit offset. If the third indication information is "001", the second PRB (namely, PRB #10) in the 11 PRBs is used for PUCCH transmission. If the third indication information is "000", the first PRB (namely, PRB #0) in the 11 PRBs is used for PUCCH transmission.

Manner 3: The third indication information is used to indicate a pattern. The pattern indicates a type of distribution, in the L resource units, of all resource units in the PUCCH resource.

The pattern specifies a position of the PUCCH resource in the uplink transmission resource. The terminal may learn of a position of the PUCCH resource in the transmission bandwidth based on the pattern indicated by the third indication information and a position of the uplink transmission resource.

The network device may indicate a pattern by using a bitmap or a list. For a specific principle, refer to the foregoing descriptions, and details are not described herein again.

Manner 4: The third indication information is used to indicate a pattern identifier (pattern ID). The pattern identifier is used to indicate a pattern, and the pattern indicates a type of distribution, in the L resource units, of all resource units in the PUCCH resource.

In manner 4, the terminal may have a pattern set. The pattern set includes a plurality of patterns, and each pattern corresponds to one pattern identifier. In this case, the terminal may determine the pattern based on the pattern identifier indicated by the third indication information, and may learn of a position of the PUCCH resource in the transmission bandwidth based on a position of the uplink transmission resource.

The pattern set may be preset in the terminal and presented in a graph, for example, may be defined in a communication standard.

Alternatively, the pattern set may be configured by the network device for the terminal. In this case, optionally, the method further includes: The network device sends configuration information to the terminal, where the configuration information is used to configure a pattern set, and the pattern set includes a plurality of patterns. Correspondingly, the terminal receives the configuration information from the network device. The terminal may determine the pattern set based on the configuration information. For example, the network device may configure the pattern set by using RRC signaling, and indicate the pattern identifier by using DCI.

Figure 5:
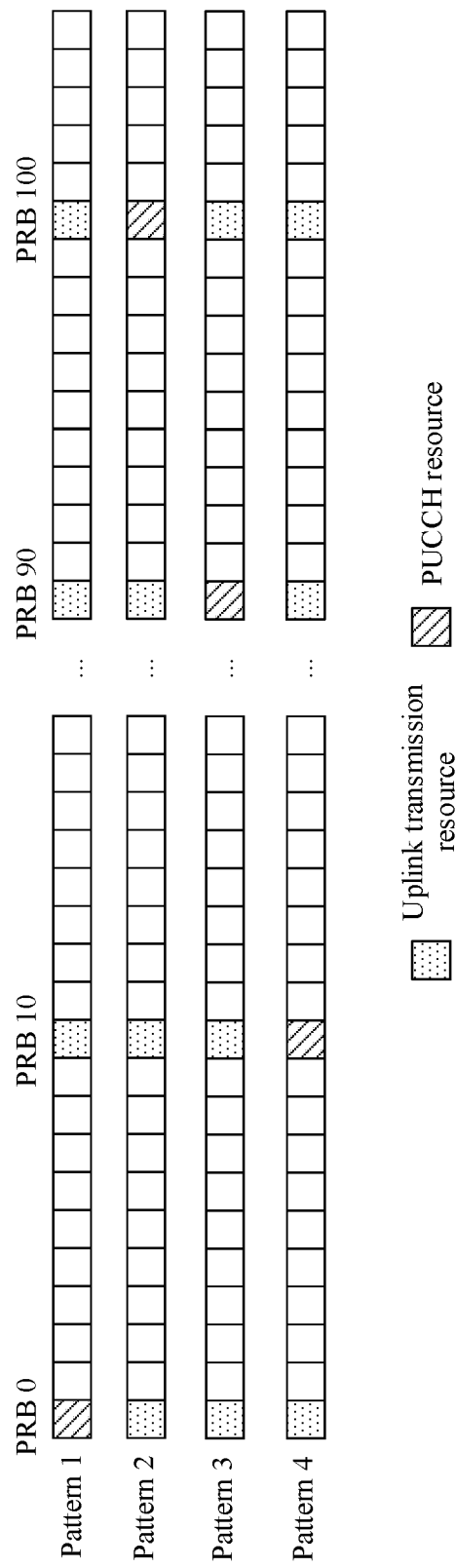
FIG. 5 is a schematic diagram of distribution of uplink transmission resources and of PUSCH resources according to an embodiment of this application.

For example, FIG. 5 shows four patterns. The four patterns form a pattern set. It is assumed that the uplink transmission resource is one second resource unit, and the second resource unit includes 10 PRBs. In this case, a PUCCH resource in pattern 1 is the first PRB in the uplink transmission resource, a PUCCH resource in pattern 2 is the last PRB in the uplink transmission resource, a PUCCH resource in pattern 3 is the last but one PRB in the uplink transmission resource, and a PUCCH resource in pattern 4 is the second PRB in the uplink transmission resource.

Based on the example shown in FIG. 5, if the first indication information indicates that the RIV is 0, it can be learned from the example shown in FIG. 4 that the terminal may learn that the uplink transmission resource includes 11 PRBs in total: PRB #0, PRB #10, . . . , and PRB #100. If the third indication information indicates that the pattern ID is 1, the terminal may determine that the first PRB (namely, PRB #0) in the uplink transmission resource is used for PUCCH transmission.

It should be noted that, when the network device configures the pattern set for the terminal, the network device may not indicate the pattern identifier by using the third indication information, but the terminal calculates the pattern identifier by itself. In this case, there may be a correspondence between a pattern in the pattern set and other information that is known or that may be learned of by the terminal. For example, there is a corresponding mapping relationship between a pattern ID and a UE ID (that is, an identifier of the terminal). The terminal may calculate the corresponding pattern ID based on the UE ID, for example, pattern ID=UE ID mod S, where S is a positive integer. Based on the example shown in FIG. 5, if the first indication information indicates that the RIV is 0, the terminal may learn that the uplink transmission resource includes 11 PRBs in total: PRB #0, PRB #10, . . . , and PRB #100. Assuming that the UE ID is 5 and S is 4, the terminal may calculate that the pattern ID is 1, and the terminal may determine that the first PRB (namely, PRB #0) in the uplink transmission resource is used for PUCCH transmission.

Manner 5: The third indication information is an RIV, and the RIV has a correspondence with an index of a start resource unit in the PUCCH resource and a quantity of resource units in the PUCCH resource.

In the manner 5, one RIV corresponds to an index of a start resource unit in one PUCCH resource and a quantity of resource units in one PUCCH resource. Different RIVs correspond to different indexes of start resource units in PUCCH resources and/or different quantities of resource units in the PUCCH resources. The network device indicates the RIV to the terminal, and the terminal learns of, based on the RIV, the index of the start resource unit used for PUCCH transmission and the quantity of resource units, to further learn of a position of a resource used for PUCCH transmission.

In manner 5, the network device can calculate a unique RIV by using a resource indication and calculation manner in NR/LTE, that is, based on an index of a start resource unit in the PUCCH resource and a quantity of resource units in the PUCCH resource. The terminal can also reversely calculate, based on an RIV, an index of a start resource unit in the PUCCH resource allocated to the terminal and a quantity of resource units in the PUCCH resource, to determine a position of a resource used for PUCCH transmission.

The following uses an example in which the resource unit is a PRB to describe the RIV calculation manner in manner 5. It may be understood that the RIV calculation manner is not limited to the manner described in this specification, and may be another manner. This is not limited in this embodiment of this application.

An index of a start PRB used for PUCCH transmission is denoted as $PRB_{pucch}$. Optionally, the index is a relative index relative to the uplink transmission resource. A quantity of PRBs used for PUCCH transmission is denoted as $L_{pucch}$, and a quantity of PRBs corresponding to the uplink transmission resource is denoted as $N_{UL}$. In this case:

if $(L_{pucch}-1) \leq \lfloor N_{UL}/2 \rfloor$, $RIV=N_{UL}(L_{pucch}-1)+PRB_{pucch}$; or if $(L_{pucch}-1) > \lfloor N_{UL}/2 \rfloor$, $RIV=N_{UL}(N_{UL}-L_{pucch}+1)+(N_{UL}-1-PRB_{pucch})$.

Manner 6: The third indication information indicates the first signal resource.

Because the uplink transmission resource includes the PUCCH resource and the first signal resource, after determining the first signal resource, the terminal may determine that a resource other than the first signal resource in the uplink transmission resource is the PUCCH resource.

The third indication information may indicate the first signal resource in any one of manner 1 to manner 5 in the foregoing embodiment. A difference lies only in that the first signal resource is indicated herein.

In Embodiment 1, there are, but not limited to, the following eight cases for signaling used to indicate whether the uplink transmission resource is shared, signaling used to indicate the uplink transmission resource, and signaling used to indicate the PUCCH resource:

1. Whether the PUCCH and the first signal share the uplink transmission resource is indicated by using RRC signaling, the uplink transmission resource is indicated by using DCI (that is, a UL grant), and the position of the PUCCH resource in the uplink transmission resource is indicated by using DCI (that is, a DL grant and/or a UL grant).

2. Whether the PUCCH and the first signal share the uplink transmission resource is indicated by using RRC signaling, the uplink transmission resource is indicated by using DCI (that is, a UL grant), and the position of the PUCCH resource in the uplink transmission resource is preconfigured.

3. Whether the PUCCH and the first signal share the uplink transmission resource is indicated by using RRC signaling, the uplink transmission resource is indicated by using DCI (that is, a UL grant), and the pattern is indicated by using RRC signaling.

4. Whether the PUCCH and the first signal share the uplink transmission resource is indicated by using RRC signaling, the uplink transmission resource is indicated by using DCI (that is, a UL grant), the pattern set is indicated by using RRC signaling, and the pattern ID is indicated by using DCI.

5. Whether the PUCCH and the first signal share the uplink transmission resource is indicated by using DCI, the uplink transmission resource is indicated by using DCI (that is, a UL grant), and the position of the PUCCH resource in the uplink transmission resource is indicated by using DCI (that is, a DL grant and/or a UL grant).

6. Whether the PUCCH and the first signal share the uplink transmission resource is indicated by using DCI, the uplink transmission resource is indicated by using DCI (that is, a UL grant), and the position of the PUCCH resource in the uplink transmission resource is preconfigured.

7. Whether the PUCCH and the first signal share the uplink transmission resource is indicated by using DCI, the uplink transmission resource is indicated by using DCI (that is, a UL grant), and the pattern is indicated by using RRC signaling.

8. Whether the PUCCH and the first signal share the uplink transmission resource is indicated by using DCI, the uplink transmission resource is indicated by using DCI (that is, a UL grant), the pattern set is indicated by using RRC signaling, and the pattern ID is indicated by using DCI.

Embodiment 2

Figure 6:
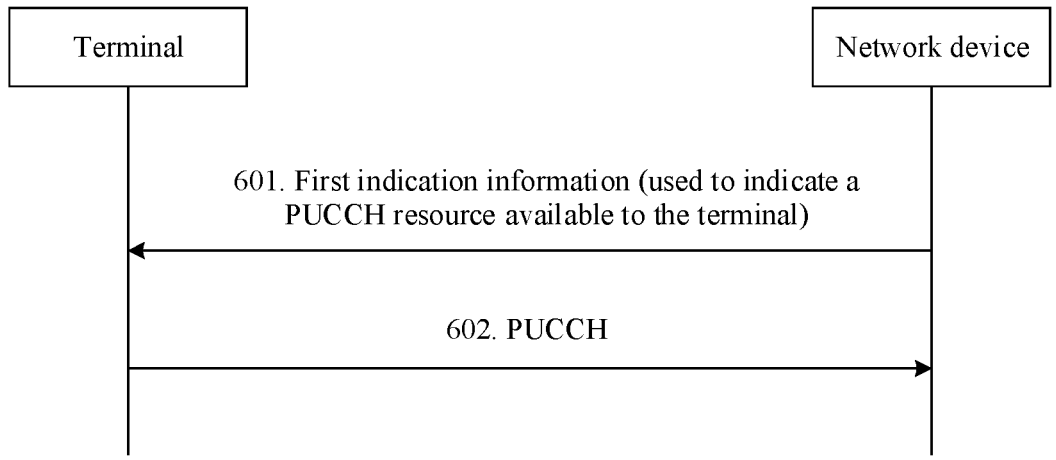
FIG. 6 is a flowchart of a signal transmission method according to an embodiment of this application.

In LTE-eLAA, transmission of a PUCCH in an unlicensed frequency band cannot be supported. To support transmission of a PUCCH in an unlicensed frequency band, an embodiment of this application further provides a signal transmission method. As shown in FIG. 6, the method includes the following steps.

601. A network device sends first indication information to a terminal, where the first indication information is used to indicate a PUCCH resource available to the terminal.

Correspondingly, the terminal receives the first indication information from the network device.

The PUCCH resource is a resource used by the terminal to send a PUCCH, and the PUCCH resource is located in an unlicensed frequency band.

The first indication information may be carried in higher layer signaling (e.g., RRC signaling or MAC CE signaling) and/or DCI.

Optionally, the PUCCH resource includes L resource units, and L is an integer greater than or equal to 0. When L=0, it indicates that the network device does not allocate a PUCCH resource to the terminal. In this case, if the terminal determines, based on the first indication information, that no PUCCH resource is available, the terminal does not perform PUCCH transmission.

It should be noted that, if the resource unit is a first resource unit, L first resource units may be a part or all of a second resource unit. If the L first resource units are a part of the second resource unit, other resource units in the second resource unit may be used to transmit another signal (e.g., the first signal in Embodiment 1), or may not be used to transmit a signal. This is not specifically limited in this embodiment of this application.

Optionally, to ensure that the PUCCH resource meets an OCB requirement of the ETSI, a ratio of a frequency domain span of the PUCCH resource to a transmission bandwidth is greater than a preset threshold. The frequency domain span of the PUCCH resource is a bandwidth span between the first resource unit and the last resource unit in the PUCCH resource. The preset threshold may be determined according to the OCB requirement of the ETSI.

It may be understood that the PUCCH resource may be of an interlace structure or may not be of an interlace structure in the transmission bandwidth. This is not specifically limited in this embodiment of this application. For example, the PUCCH resource may be an interlace or a partial interlace. When the PUCCH resource includes some PRBs in an interlace, the PUCCH resource may be referred to as a partial interlace.

602. The terminal sends the PUCCH on the PUCCH resource based on the first indication information.

Correspondingly, the network device receives the PUCCH from the terminal on the PUCCH resource.

According to the method provided in Embodiment 2 of this application, the PUCCH resource in the unlicensed frequency band is allocated to the terminal, to resolve a problem that the PUCCH cannot be transmitted in the unlicensed frequency band.

Optionally, the method further includes: The network device sends second indication information to the terminal, where the second indication information is used to indicate whether the PUCCH is transmitted through frequency hopping. Correspondingly, the terminal receives the second indication information from the network device. The terminal determines, based on the second indication information, whether to transmit the PUCCH through frequency hopping.

Optionally, the method further includes: The network device sends third indication information to the terminal, where the third indication information is used to indicate an index of a start resource unit and a quantity of resource units in resource units used in a next hop during the frequency hopping transmission of the PUCCH. Correspondingly, the terminal receives the third indication information from the network device. The terminal determines, based on the third indication information, a resource used when the PUCCH is transmitted through frequency hopping. A method for indicating the PUCCH resource by using the third indication information is similar to the method for indicating the PUCCH resource by using the first indication information. For details, refer to the following descriptions. Details are not described herein.

A function of the first indication information in step 601 may be implemented in any one of the following manners (1) to (5). For specific implementations of manner (1) to manner (4), respectively refer to the specific implementations of manner 1 to manner 4 in Embodiment 1. A difference lies only in that the PUCCH resource is indicated in manner (1) to the manner (4). Optionally, the indication in manner (1) to manner (4) may also be performed in combination with manner (5).

Manner (1)

The first indication information indicates the L resource units by using a bitmap.

Manner (2)

The first indication information is an RIV. The RIV has a correspondence with an index of a start resource unit in the PUCCH resource and a quantity of resource units in the PUCCH resource.

Manner (3)

The PUCCH resource includes L second resource units. The first indication information is an RIV, and the RIV has a correspondence with an index of a start first resource unit in the PUCCH resource and a quantity of second resource units in the PUCCH resource.

Optionally, in an alternative implementation of manner (3), the PUCCH resource includes L second resource units. The first indication information is an RIV, and the RIV has a correspondence with an index of a start second resource unit in the PUCCH resource and a quantity of second resource units in the PUCCH resource.

Manner (4)

The PUCCH resource includes L second resource units, and the first indication information is used to indicate an index of a start first resource unit of the Pt second resource unit in the PUCCH resource, a quantity of second resource units in the PUCCH resource, and an offset between an index of a start first resource unit of each of the $2^{nd}$ to the $L^{th}$ second resource units and the index of the start first resource unit of the Pt second resource unit.

Manner (5)

The resource unit is a second resource unit, the first indication information is used to indicate a structure of the PUCCH resource and an index of a start first resource unit (or a start second resource unit) included in the PUCCH resource, and the structure of the PUCCH resource includes one or more of the following information: a quantity of second resource units included in the PUCCH resource, a quantity of first resource units included in each second resource unit included in the PUCCH resource, or a spacing between adjacent first resource units in first resource units included in each second resource unit included in the PUCCH resource.

In manner (5), the terminal may determine a start position of the PUCCH resource based on the start first resource unit (or the start second resource unit), and then determine distribution of the PUCCH resource in the transmission bandwidth based on the structure of the PUCCH resource, to accurately determine the PUCCH resource.

That the second resource unit is an interlace is used as an example. For manner (5), the following uses example 1 to example 3 for description.

Example 1

The network device may modify PUCCH-Config in current RRC signaling to define a PUCCH-resource configuration parameter, where the PUCCH-resource configuration parameter is used to configure the PUCCH resource. The PUCCH-resource configuration parameter includes but is not limited to a parameter used to indicate one or more of the following information: (1) whether the PUCCH uses an interlace structure; (2) the interlace structure, where the interlace structure may be represented by using information such as a quantity of PRBs (denoted as an interlace size) included in each interlace and a spacing (denoted as an interlace spacing) between two adjacent PRBs in the interlace; and (3) an index of a start PRB of the first interlace in the PUCCH resource.

For example, PUCCH-resource may be specifically as follows:

```
PUCCH-Resource ::=                  SEQUENCE {
pucch-ResourceId                        PUCCH-ResourceId
startingPRB                             PRB-Id
intraSlotFrequencyHopping               ENUMERATED { enabled, disabled}
interlaced                              ENUMERATED { enabled, disabled}
interlace structure                         interlace structure
secondHopPRB                            PRB-Id
    ...
interlace structure ::= SEQUENCE{
interlace size:         {M}
interlace spacing:      {N}
}
```

In this example, an interlaced field is used to indicate whether the PUCCH uses an interlace structure, and an existing startingPRB field is used to indicate an index of a start PRB of the first interlace in the PUCCH resource. It should be noted that a pucch-ResourceId field in example 1 to example 3 is used to indicate a resource ID of the PUCCH.

Further, for different PUCCH formats, detailed information about the PUCCH resource may be further indicated in the RRC signaling. For example, for PUCCH-format 2 or PUCCH-format 3, the detailed information about the PUCCH resource may be as follows:

```
PUCCH-format2/3::=              SEQUENCE {
nrofPRBs                            INTEGER (1..X)
nrofSymbols                         INTEGER (1..Y)
startingSymbolIndex                 INTEGER(0..13)
}
```

When the interlaced field is enabled, nrofPRBs may be used to indicate a quantity of interlaces or a quantity of PRBs included in an interlace. Certainly, the quantity of interlaces or the quantity of PRBs included in the interlace may alternatively be indicated by using a new field, for example, nrofInterlace.

Example 2

The network device may design a new PUCCH-resource configuration parameter in current RRC signaling, where the PUCCH-resource configuration parameter is used to configure the PUCCH resource. The PUCCH-resource configuration parameter includes but is not limited to a parameter used to indicate one or more of the following information: (1) a PUCCH resource index (denoted as pucch-ResourceId); (2) whether the PUCCH uses an interlace structure; (3) the interlace structure, where the interlace structure may be represented by using information such as an interlace size and an interlace spacing; (4) an index of a start PRB of the first interlace in the PUCCH resource; and (5) frequency hopping indication information.

For example, PUCCH-resource may be specifically as follows:

```
PUCCH-Resource ::=              SEQUENCE {
pucch-ResourceId                    PUCCH-ResourceId
startingInterlace                   interlace-Id/ PRB-Id
    intraSlotFrequencyHopping           ENUMERATED { enabled, disabled?}
interlace structure                 interlace structure
secondHopInterlace                  interlace-Id /PRB-Id
    ...
interlace structure ::=SEQUENCE{
interlace number:       {M}
interlace spacing:      {N}
}
```

A startingInterlace field is used to indicate an index of a start interlace in the PUCCH resource or an index of a start PRB in a start interlace, intraSlotFrequencyHopping is used to indicate whether to perform frequency hopping transmission, and secondHopInterlace is used to indicate an index of a start PRB or an index of a start interlace in a resource used in a next hop during frequency hopping transmission of the PUCCH.

Further, for different PUCCH formats (format), detailed information about the PUCCH resource may be further indicated in the RRC signaling. For example, for PUCCH-format 2 or PUCCH-format 3, the detailed information about the PUCCH resource may be as follows:

```
PUCCH-format2/3::=      SEQUENCE {
    nrofInterlaces          INTEGER (1..X)
    nrofSymbols             INTEGER (1..Y)
    startingSymbolIndex  INTEGER(0..Z)
}
``` nrofInterlaces may be used to indicate a quantity of interlaces or a quantity of PRBs included in an interlace. Certainly, the quantity of interlaces or the quantity of PRBs included in the interlace may alternatively be indicated by using an existing field, for example, nrofPRBs.

Example 3

In this example, the PUCCH resource includes some PRBs in an interlace. In this case, the PUCCH resource may be referred to as a partial interlace, and the PUCCH-resource configuration parameter includes but is not limited to a parameter used to indicate one or more of the following information: (1) a PUCCH resource index (denoted as pucch-ResourceId); (2) whether the PUCCH uses an interlace structure; (3) the interlace structure, where the interlace structure may be represented by using information such as an interlace size and an interlace spacing; (4) an index of a start PRB of the first interlace in the PUCCH resource; and (5) frequency hopping indication information, used to indicate whether the PUCCH is transmitted through frequency hopping; (6) a quantity of interlaces included in the PUCCH resource; (7) whether the PUCCH supports the partial interlace; (8) a partial interlace pattern, used to indicate a position of the partial interlace in the interlace; (9) an index of the interlace to which the partial interlace belongs; (10) a start PRB and/or an end PRB of the partial interlace in the interlace to which the partial interlace belongs; and (11) an index of a start PRB or an index of a start interlace in a resource used in a next hop during frequency hopping transmission of the PUCCH.

The quantity of interlaces may be indicated by using an nrofInterlace field. Whether the partial interlace is supported may be indicated by using a partial interlace field, and the partial interlace field may occupy one bit. The frequency hopping indication information may be indicated by using an intraSlotFrequencyHopping field. For fields used for indicating other information, refer to the fields in example 1 and example 2. Details are not described herein again.

The foregoing mainly describes the solutions in the embodiments of this application from a perspective of interaction between network elements. It may be understood that, to implement the foregoing functions, network elements such as the network device and the terminal include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, the network device and the terminal may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit. It should be noted that, in the embodiments of this application, division into units is an example, and is merely logical function division. In actual implementation, another division manner may be used.

Figure 7:
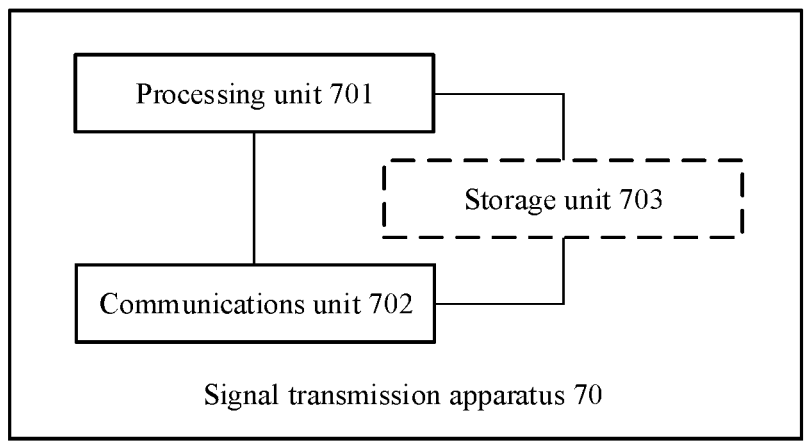
FIG. 7 to FIG. 9 are schematic composition diagrams of signal transmission apparatuses according to embodiments of this application.

When an integrated unit is used, FIG. 7 is a possible schematic structural diagram of a signal transmission apparatus (denoted as a signal transmission apparatus 70) in the foregoing embodiments. The signal transmission apparatus 70 includes a processing unit 701 and a communication unit 702, and may further include a storage unit 703. The schematic structural diagram shown in FIG. 7 may be used to show a structure of the network device or the terminal in the foregoing embodiments.

When the schematic structural diagram shown in FIG. 7 is used to show the structure of the network device in the foregoing embodiments, the processing unit 701 is configured to control and manage an action of the network device. For example, the processing unit 701 is configured to support the network device in performing step 301 and step 302 in FIG. 3, step 601 and step 602 in FIG. 6, and/or an action performed by the network device in another process described in the embodiments of this application. The processing unit 701 may communicate with another network entity through the communication unit 702, for example, communicate with the terminal shown in FIG. 3. The storage unit 703 is configured to store program code and data of the network device.

When the schematic structural diagram shown in FIG. 7 is used to show the structure of the network device in the foregoing embodiments, the signal transmission apparatus 70 may be a network device, or may be a chip in the network device.

When the schematic structural diagram shown in FIG. 7 is used to show the structure of the terminal in the foregoing embodiments, the processing unit 701 is configured to control and manage an action of the terminal. For example, the processing unit 701 is configured to support the terminal in performing step 301 and step 302 in FIG. 3, step 601 and step 602 in FIG. 6, and/or an action performed by the terminal in another process described in the embodiments of this application. The processing unit 701 may communicate with another network entity through the communication unit 702, for example, communicate with the network device shown in FIG. 3. The storage unit 703 is configured to store program code and data of the terminal.

When the schematic structural diagram shown in FIG. 7 is used to show the structure of the terminal in the foregoing embodiments, the signal transmission apparatus 70 may be a terminal, or may be a chip in the terminal.

When the signal transmission apparatus 70 is the terminal or the network device, the processing unit 701 may be a processor or a controller, and the communication unit 702 may be a communication interface, a transceiver, a transceiver machine, a transceiver circuit, a transceiver apparatus, or the like. The communication interface is a collective term, and may include one or more interfaces. The storage unit 703 may be a memory. When the signal transmission apparatus 70 is a chip in the terminal or the network device, the processing unit 701 may be a processor or a controller, and the communication unit 702 may be an input/output interface, a pin, a circuit, or the like. The storage unit 703 may be a storage unit (e.g., a register or a cache) in the chip, or may be a storage unit (e.g., a read-only memory or a random access memory) that is in the terminal or the network device and that is located outside the chip.

The communication unit may also be referred to as a transceiver unit. An antenna and a control circuit that have receiving and sending functions in the signal transmission apparatus 70 may be considered as the communication unit 702 in the signal transmission apparatus 70, and a processor that has a processing function may be considered as the processing unit 701 in the signal transmission apparatus 70. Optionally, a component configured to implement a receiving function in the communication unit 702 may be considered as a receiving unit. The receiving unit is configured to perform the receiving step in the embodiments of this application. The receiving unit may be a receiver, a receiver machine, a receiver circuit, or the like. A component configured to implement a sending function in the communication unit 702 may be considered as a sending unit. The sending unit is configured to perform the sending step in the embodiments of this application. The sending unit may be a transmitter, a transmitter machine, a transmitter circuit, or the like.

When an integrated unit in FIG. 7 is implemented in a form of a software function module and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods in the embodiments of this application. The storage medium that stores the computer software product includes any medium that can store program code, for example, a USB flash drive, a removable hard disk, a read-only memory (ROM), a random access memory (RAM), a magnetic disk, or an optical disc.

The unit in FIG. 7 may alternatively be referred to as a module. For example, the processing unit may be referred to as a processing module.

Figure 8:
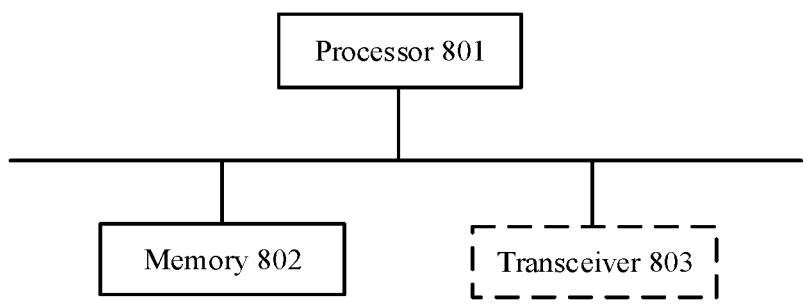
Figure 9:
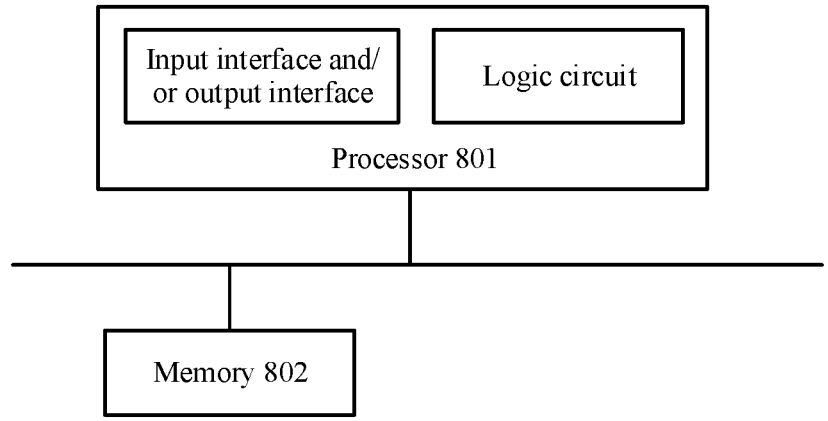

An embodiment of this application further provides a structural diagram of a hardware structure of a signal transmission apparatus (denoted as a signal transmission apparatus 80). Referring to FIG. 8 or FIG. 9, the signal transmission apparatus 80 includes a processor 801, and optionally, further includes a memory 802 connected to the processor 801.

The processor 801 may be a general-purpose central processing unit (CPU), a microprocessor, an application-specific integrated circuit (ASIC), or one or more integrated circuits configured to control program execution in the solutions in this application. The processor 801 may alternatively include a plurality of CPUs, and the processor 801 may be a single-core (single-CPU) processor or a multi-core (multi-CPU) processor. The processor herein may refer to one or more devices, circuits, and/or processing cores configured to process data (e.g., computer program instructions).

The memory 802 may be a ROM or another type of static storage device that can store static information and instructions, or a RAM or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory is not limited in this embodiment of this application. The memory 802 may exist independently, or may be integrated into the processor 801. The memory 802 may include computer program code. The processor 801 is configured to execute the computer program code stored in the memory 802, to implement a method provided in the embodiments of this application.

In a first possible implementation, referring to FIG. 8, the signal transmission apparatus 80 further includes a transceiver 803. The processor 801, the memory 802, and the transceiver 803 are connected via a bus. The transceiver 803 is configured to communicate with another device or a communication network. Optionally, the transceiver 803 may include a transmitter and a receiver. A component configured to implement a receiving function in the transceiver 803 may be considered as a receiver. The receiver is configured to perform the receiving step in the embodiments of this application. A component configured to implement a sending function in the transceiver 803 may be considered as a transmitter. The transmitter is configured to perform the sending step in the embodiments of this application.

Based on the first possible implementation, the schematic structural diagram shown in FIG. 8 may be used to show a structure of the network device or the terminal in the foregoing embodiments. When the schematic structural diagram shown in FIG. 8 is used to show the structure of the network device in the foregoing embodiments, the processor 801 is configured to control and manage an action of the network device. For example, the processor 801 is configured to support the network device in performing step 301 and step 302 in FIG. 3, step 601 and step 602 in FIG. 6, and/or an action performed by the network device in another process described in the embodiments of this application. The processor 801 may communicate with another network entity through the transceiver 803, for example, communicate with the terminal shown in FIG. 3. The memory 802 is configured to store program code and data of the network device. When the schematic structural diagram shown in FIG. 8 is used to show the structure of the terminal in the foregoing embodiments, the processor 801 is configured to control and manage an action of the terminal. For example, the processor 801 is configured to support the terminal in performing step 301 and step 302 in FIG. 3, step 601 and step 602 in FIG. 6, and/or an action performed by the terminal in another process described in the embodiments of this application. The processor 801 may communicate with another network entity through the transceiver 803, for example, communicate with the network device shown in FIG. 3. The memory 802 is configured to store program code and data of the terminal.

In a second possible implementation, the processor 801 includes a logic circuit and an input interface and/or an output interface. The output interface is configured to perform a sending action in a corresponding method, and the input interface is configured to perform a receiving action in a corresponding method.

Based on the second possible implementation, the schematic structural diagram shown in FIG. 9 may be used to show a structure of the network device or the terminal in the foregoing embodiments. When the schematic structural diagram shown in FIG. 9 is used to show the structure of the network device in the foregoing embodiments, the processor 801 is configured to control and manage an action of the network device. For example, the processor 801 is configured to support the network device in performing step 301 and step 302 in FIG. 3, step 601 and step 602 in FIG. 6, and/or an action performed by the network device in another process described in the embodiments of this application. The processor 801 may communicate with another network entity by using an input interface and/or an output interface, for example, communicate with the terminal shown in FIG. 3. The memory 802 is configured to store program code and data of the network device. When the schematic structural diagram shown in FIG. 9 is used to show the structure of the terminal in the foregoing embodiments, the processor 801 is configured to control and manage an action of the terminal. For example, the processor 801 is configured to support the terminal in performing step 301 and step 302 in FIG. 3, step 601 and step 602 in FIG. 6, and/or an action performed by the terminal in another process described in the embodiments of this application. The processor 801 may communicate with another network entity by using an input interface and/or an output interface, for example, communicate with the network device shown in FIG. 3. The memory 802 is configured to store program code and data of the terminal.

In addition, the embodiments of this application further provide schematic diagrams of hardware structures of a terminal (denoted as a terminal 100) and a network device (denoted as a network device 110). For details, refer to FIG. 10 and FIG. 11.

Figure 10:
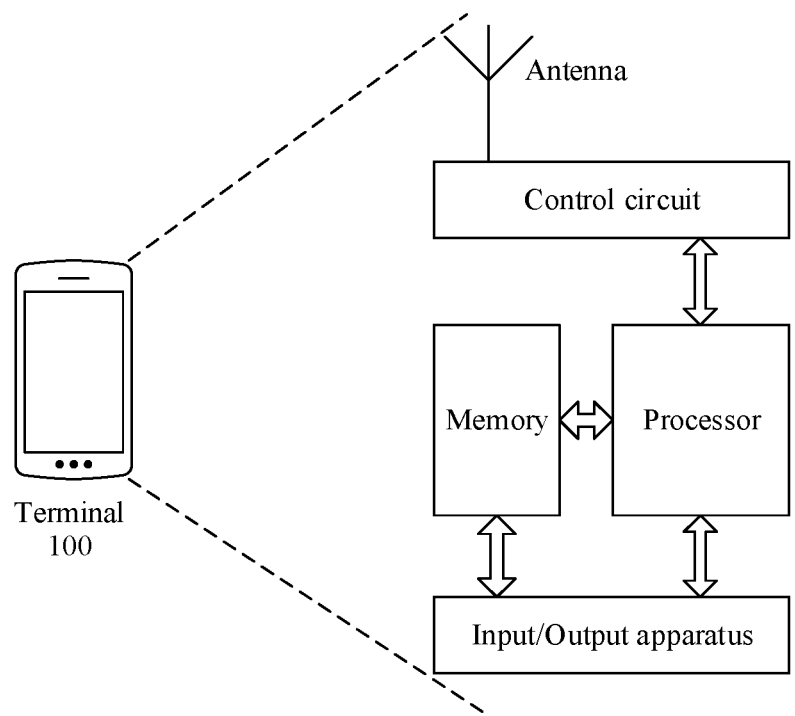
FIG. 10 is a schematic diagram of a hardware structure of a terminal according to an embodiment of this application.

FIG. 10 is the schematic diagram of the hardware structure of the terminal 100. For ease of description, FIG. 10 shows only main components of the terminal. As shown in FIG. 10, the terminal 100 includes a processor, a memory, a control circuit, an antenna, and an input/output apparatus.

The processor is mainly configured to: process a communication protocol and communication data, control the entire terminal, execute a software program, and process data of the software program. For example, the processor is configured to control the terminal to perform step 301 and step 302 in FIG. 3, step 601 and step 602 in FIG. 6, and/or an action performed by the terminal in another process described in the embodiments of this application. The memory is mainly configured to store the software program and the data. The control circuit (which may also be referred to as a radio frequency circuit) is mainly configured to: perform conversion between a baseband signal and a radio frequency signal, and process the radio frequency signal. A combination of the control circuit and the antenna may also be referred to as a transceiver that is mainly configured to receive/send a radio frequency signal in a form of an electromagnetic wave. The input/output apparatus, such as a touchscreen, a display screen, or a keyboard, is mainly configured to: receive data entered by a user, and output data to the user.

After the terminal is powered on, the processor can read the software program in the memory, interpret and execute instructions of the software program, and process the data of the software program. When the processor needs to send data through the antenna, after performing baseband processing on the to-be-sent data, the processor outputs a baseband signal to the control circuit; and the control circuit performs radio frequency processing on the baseband signal and then sends the radio frequency signal to the outside in a form of an electromagnetic wave through the antenna. When data is sent to the terminal, the control circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 10 shows only one memory and one processor. An actual terminal may include a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process a communication protocol and communication data, and the central processing unit is mainly configured to: control the entire terminal, execute the software program, and process the data of the software program. The processor in FIG. 10 integrates functions of the baseband processor and the central processing unit. A person skilled in the art may understand that the baseband processor and the central processing unit may be independent processors, and are interconnected by using technologies such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be referred to as a baseband processing circuit or a baseband processing chip. The central processing unit may also be referred to as a central processing circuit or a central processing chip. A function of processing the communication protocol and the communication data may be built in the processor, or may be stored in the memory in a form of a software program. The processor executes the software program to implement a baseband processing function.

Figure 11:
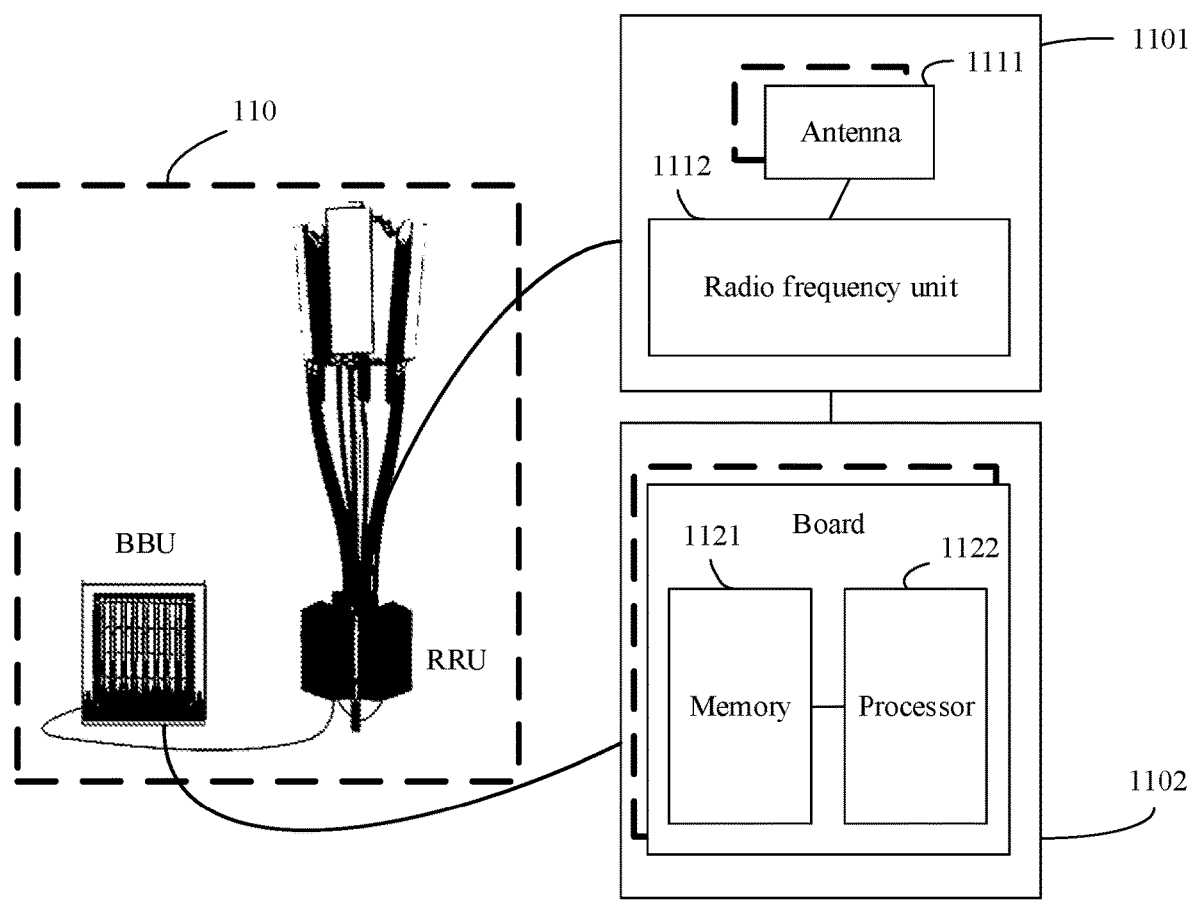
FIG. 11 is a schematic diagram of a hardware structure of a network device according to an embodiment of this application.

FIG. 11 is the schematic diagram of the hardware structure of the network device 110. The network device 110 may include one or more radio frequency units, such as a remote radio unit (RRU) 1101 and one or more baseband units (BBU) (which may also be referred to as digital unit (DU)) 1102.

The RRU 1101 may be referred to as a transceiver unit, a transceiver machine, a transceiver circuit, a transceiver, or the like, and may include at least one antenna 1111 and a radio frequency unit 1112. The RRU 1101 is mainly configured to perform receiving and sending of a radio frequency signal and conversion between the radio frequency signal and a baseband signal, for example, configured to send the first indication information in the foregoing method embodiments. The RRU 1101 and the BBU 1102 may be physically disposed together, or may be physically separated, for example, in a distributed base station.

The BBU 1102 is a control center of the network device, may be referred to as a processing unit, and is mainly configured to complete baseband processing functions such as channel coding, multiplexing, modulation, and spectrum spreading.

In an embodiment, the BBU 1102 may include one or more boards. A plurality of boards may jointly support a radio access network (such as an LTE network) of a single access standard, or may separately support radio access networks (such as an LTE network, a 5G network, or another network) of different access standards. The BBU 1102 further includes a memory 1121 and a processor 1122. The memory 1121 is configured to store necessary instructions and necessary data. The processor 1122 is configured to control the network device to perform a necessary action. The memory 1121 and the processor 1122 may serve one or more boards. In other words, a memory and a processor may be independently disposed on each board. Alternatively, a plurality of boards may share a same memory and a same processor. In addition, a necessary circuit may be further disposed on each board.

It should be understood that the network device 110 shown in FIG. 11 can perform step 301 and step 302 in FIG. 3, step 601 and step 602 in FIG. 6, and/or an action performed by the network device in another process described in the embodiments of this application. The operations and/or the functions of the modules in the network device 110 are intended to implement corresponding procedures in the foregoing method embodiments. For details, refer to the descriptions in the foregoing method embodiment. To avoid repetition, detailed descriptions are properly omitted herein.

In an implementation process, the steps of the methods in the embodiments may be performed by using a hardware integrated logical circuit in the processor, or by using instructions in a form of software. The steps of the methods disclosed with reference to the embodiments of this application may be directly performed by a hardware processor, or may be performed by a combination of hardware and software modules in the processor. For other descriptions about the processor in FIG. 10 and FIG. 11, refer to the descriptions related to the processor in FIG. 8 and FIG. 9. Details are not described again.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system, including the foregoing network device and the foregoing terminal.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., DVD), a semiconductor medium (e.g., a solid-state drive (SSD)), or the like.

Although this application is described with reference to the embodiments, in a process of implementing this application that claims protection, a person skilled in the art may understand and implement another variation of the disclosed embodiments by viewing the appended drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A signal transmission method carried out by a terminal, the method comprising:
    receiving first indication information from a network device that is used to indicate an uplink transmission resource available to the terminal, wherein the uplink transmission resource available to the terminal comprises an interlace resource located in an unlicensed frequency band;
    receiving second indication information from the network device that is used to indicate that a physical uplink control channel (PUCCH) and a physical uplink shared channel (PUSCH) share the interlace resource, wherein the second indication information is carried in radio resource control (RRC) signaling;
    receiving third indication information from the network device that is used to indicate a PUCCH resource for transmitting the PUCCH in the interlace resource, wherein the third indication information is carried in radio resource control (RRC) signaling, and wherein the PUCCH resource is used to transmit the PUCCH; and sending the PUCCH and the PUSCH on the interlace resource.

2. The method according to claim 1, wherein the interlace resource further comprises a PUSCH resource that is used to transmit the PUSCH.

3. The method according to claim 1, wherein interlace resource comprises L resource units, wherein each one of the resource units is a first resource unit or a second resource unit,
wherein the second resource unit comprises a plurality of first resource units,
wherein the plurality of first resource units comprised in one second resource unit are evenly distributed in a transmission bandwidth, and
wherein L is an integer greater than or equal to 0.

4. A signal transmission method carried out by a network device, the method comprising:
sending first indication information to a terminal that is used to indicate an uplink transmission resource available to the terminal, wherein the uplink transmission resource available to the terminal comprises an interlace resource located in an unlicensed frequency band;
sending second indication information to the terminal that is used to indicate that a physical uplink control channel (PUCCH) and a physical uplink shared channel (PUSCH) share the interlace resource, wherein the second indication information is carried in radio resource control (RRC) signaling;
sending third indication information to the terminal that is used to indicate a PUCCH resource for transmitting the PUCCH in the interlace resource, wherein the third indication information is carried in radio resource control (RRC) signaling, and wherein the PUCCH resource is used to transmit the PUCCH; and
receiving, from the terminal, the PUCCH and PUSCH on the interlace resource.

5. The method according to claim 4, wherein the interlace resource further comprises a PUSCH resource that is used to transmit the PUSCH.

6. The method according to claim 4, wherein the interlace resource comprises L resource units, the resource unit is a first resource unit or a second resource unit, the second resource unit comprises a plurality of first resource units, a plurality of first resource units comprised in one second resource unit are evenly distributed in a transmission bandwidth, and L is an integer greater than or equal to 0.

7. A terminal comprising:
a processor; and
a non-transitory computer-readable medium including computer-executable instructions that, when executed by the processor, facilitate carrying out a signal transmission method comprising:
receiving first indication information from a network device that is used to indicate an uplink transmission resource available to the terminal, wherein the uplink transmission resource available to the terminal comprises an interlace resource located in an unlicensed frequency band;
receiving second indication information from the network device that is used to indicate that a physical uplink control channel (PUCCH) and a physical uplink shared channel (PUSCH) share the interlace resource, wherein the second indication information is carried in radio resource control (RRC) signaling;
receiving third indication information from the network device that is used to indicate a PUCCH resource for transmitting the PUCCH in the interlace resource, wherein the third indication information is carried in radio resource control (RRC) signaling, and wherein the PUCCH resource is used to transmit the PUCCH; and
sending the PUCCH and the PUSCH on the interlace resource.

8. The terminal according to claim 7, wherein the interlace resource further comprises a PUSCH resource that is used to transmit the PUSCH.

9. The terminal according to claim 7, wherein the interlace resource comprises L resource units, wherein each one of the resource units is a first resource unit or a second resource unit, wherein the second resource unit comprises a plurality of first resource units, wherein the plurality of first resource units comprised in one second resource unit are evenly distributed in a transmission bandwidth, and wherein L is an integer greater than or equal to 0.

10. A network device comprising:
a processor; and
a non-transitory computer-readable medium including computer-executable instructions that, when executed by the processor, facilitate carrying out a signal transmission method comprising:
sending first indication information to a terminal that is used to indicate an uplink transmission resource available to the terminal, wherein the uplink transmission resource available to the terminal comprises an interlace resource located in an unlicensed frequency band;
sending second indication information to the terminal that is used to indicate that a physical uplink control channel (PUCCH) and a physical uplink shared channel (PUSCH) share the interlace resource, wherein the second indication information is carried in radio resource control (RRC) signaling;
sending third indication information to the terminal that is used to indicate a PUCCH resource for transmitting the PUCCH in the interlace resource, wherein the third indication information is carried in radio resource control (RRC) signaling, and wherein the PUCCH resource is used to transmit the PUCCH; and
receiving, from the terminal, the PUCCH and the PUSCH on the interlace resource.

11. The network device according to claim 10, wherein the interlace resource further comprises a PUSCH resource, wherein the PUSCH resource is used to transmit the PUSCH.

12. The network device according to claim 10, wherein the interlace resource comprises L resource units, wherein each one of the resource units is a first resource unit or a second resource unit,
wherein the second resource unit comprises a plurality of first resource units,
wherein a plurality of first resource units comprised in one second resource unit are evenly distributed in a transmission bandwidth, and
wherein L is an integer greater than or equal to 0.

13. The method according to claim 1, wherein the third indication information is used to indicate a pattern identifier that is used to indicate a pattern, and wherein the pattern indicates a type of distribution, in the L resource units, of all resource units in the PUCCH resource.

14. The method according to claim 3, wherein the first resource unit is a subcarrier, or a subcarrier group, or a physical resource block (RB) or a resource block group (RBG).

15. The method according to claim 4, wherein the third indication information is used to indicate a pattern identifier that is used to indicate a pattern, and the pattern indicates a type of distribution, in the L resource units, of all resource units in the PUCCH resource.

16. The method according to claim 6, wherein the first resource unit is a subcarrier, or a subcarrier group, or a physical resource block (RB) or a resource block group (RBG).

17. The apparatus according to claim 7, wherein the third indication information is used to indicate a pattern identifier, the pattern identifier is used to indicate a pattern, and the pattern indicates a type of distribution, in the L resource units, of all resource units in the PUCCH resource.

18. The apparatus according to claim 9, wherein the first resource unit is a subcarrier, or a subcarrier group, or a physical resource block (RB) or a resource block group (RBG).

19. The apparatus according to claim 10, wherein the third indication information is used to indicate a pattern identifier, the pattern identifier is used to indicate a pattern, and the pattern indicates a type of distribution, in the L resource units, of all resource units in the PUCCH resource.

20. The apparatus according to claim 12, wherein the first resource unit is a subcarrier, or a subcarrier group, or a physical resource block (RB) or a resource block group (RBG).

\* \* \* \* \*

UNITED STATES PATENT AND TRADEMARK OFFICE
CERTIFICATE OF CORRECTION

PATENT NO. : 12,035,315 B2
APPLICATION NO. : 17/390616
DATED : July 9, 2024
INVENTOR(S) : Jia et al.

Page 1 of 1

It is certified that error appears in the above-identified patent and that said Letters Patent is hereby corrected as shown below:

In the Claims

Claim 3: Column 35, Line 9: reads as "The method according to claim 1, wherein interlace" should read as -- The method according to claim 1, wherein the interlace --.

Signed and Sealed this
Twenty-second Day of April, 2025

Coke Morgan Stewart
*Acting Director of the United States Patent and Trademark Office*